United States Patent
Xu et al.

(10) Patent No.: US 12,069,556 B2
(45) Date of Patent: Aug. 20, 2024

(54) METHODS FOR WIRELESS COMMUNICATION, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Yang Xu, Guangdong (CN); Haorui Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 323 days.

(21) Appl. No.: 17/565,712

(22) Filed: Dec. 30, 2021

(65) Prior Publication Data
US 2022/0124595 A1   Apr. 21, 2022

Related U.S. Application Data

(63) Continuation of application No. PCT/CN2019/105794, filed on Sep. 12, 2019.

(51) Int. Cl.
| | | |
|---|---|---|
| H04W 40/02 | (2009.01) | |
| H04W 40/24 | (2009.01) | |
| H04W 40/28 | (2009.01) | |
| H04W 48/18 | (2009.01) | |
| H04W 76/20 | (2018.01) | |

(52) U.S. Cl.
CPC ......... *H04W 40/02* (2013.01); *H04W 40/248* (2013.01); *H04W 40/28* (2013.01); *H04W 48/18* (2013.01); *H04W 76/20* (2018.02)

(58) Field of Classification Search
None
See application file for complete search history.

(56) References Cited

U.S. PATENT DOCUMENTS

| | | | |
|---|---|---|---|
| 10,602,422 B1 * | 3/2020 | Jagannatha | H04L 41/5041 |
| 2014/0362822 A1 | 12/2014 | Tseng et al. | |
| 2021/0211938 A1 * | 7/2021 | Shen | H04W 40/34 |
| 2021/0329541 A1 * | 10/2021 | Salkintzis | H04W 76/16 |

FOREIGN PATENT DOCUMENTS

| | | |
|---|---|---|
| CN | 109743766 | 5/2019 |
| CN | 111095984 | 5/2020 |
| EP | 3525545 A1 | 8/2019 |

(Continued)

OTHER PUBLICATIONS

Rospatent, Russian Office Action for RU Application No. 2021139314/07, Sep. 28, 2022.

(Continued)

*Primary Examiner* — Chi H Pham
*Assistant Examiner* — Raul Rivas
(74) *Attorney, Agent, or Firm* — Hodgson Russ LLP

(57) ABSTRACT

Methods for wireless communication, a terminal device, and a network device are provided. The method includes: receiving, by the terminal device, a first message transmitted by a network device, where the first message includes a cause parameter; and ignoring or skip using, by the terminal device, a route selection descriptor (RSD) unsatisfying a cause-parameter condition according to the cause parameter.

20 Claims, 7 Drawing Sheets

(56) References Cited

FOREIGN PATENT DOCUMENTS

| RU | 2580063 C2 | 4/2016 |
|---|---|---|
| WO | 2018131984 | 7/2018 |
| WO | 2019076075 | 4/2019 |
| WO | 2019127038 | 7/2019 |
| WO | 2019128159 | 7/2019 |
| WO | 2019128195 | 7/2019 |
| WO | 2019158063 | 8/2019 |

OTHER PUBLICATIONS

IP India, Examination Report for IN Application No. 202127060790, May 12, 2022.

Mediatek Inc., "Handling of S-NSSAI in RSD Descriptor but not in the Allowed NSSAI," 3GPP Draft, C1-194599, Sep. 9, 2019.

Intel, "Clarification on PDU Session Association," 3GPP Draft, C1-195209, Sep. 9, 2019.

EPO, Extended European Search Report for EP Application No. 19945339.0, dated Jun. 2, 2022.

Oppo, "Clarification for URSP evaluation," 3GPP TSG-CT WG1 Meeting #120, C1-196076, Oct. 2019.

Qualcomm Incorporated, "Handling of PDU session type in matching URSP rule not supported by VPLMN," 3GPP TSG-CT WG1 Meeting #119, C1-194400, Aug. 2019.

JPO, Office Action for JP Application No. 2021-578174, Jun. 30, 2023.

CNIPA, First Office Action for CN Application No. 202111122561.5, Jan. 19, 2023.

EPO, Communication for EP Application No. 19945339.0, Feb. 27, 2023.

CNIPA, Second Office Action for CN Application No. 202111122561.5, Mar. 22, 2023.

Oppo, "Clarification on using user preference," SA WG2 Meeting #128bis, S2-187812, Aug. 2018.

WIPO, International Search Report for International Application No. PCT/CN2019/105794, May 27, 2020.

\* cited by examiner

METHODS FOR WIRELESS COMMUNICATION, TERMINAL DEVICE, AND NETWORK DEVICE

CROSS-REFERENCE TO RELATED APPLICATION(S)

This application is a continuation of International Application No. PCT/CN2019/105794, filed on Sep. 12, 2019, the entire disclosure of which is incorporated herein by reference.

TECHNICAL FIELD

The present disclosure relates to the communication field, and in particular, to methods for wireless communication, a terminal device, and a network device.

BACKGROUND

User equipment (UE) policies may include a UE route selection policy (URSP). The URSP policy determines a binding relationship between application data and a protocol data unit (PDU) session, and also determines what PDU session a terminal device shall establish to transmit the application data.

The URSP includes multiple route selection descriptors (RSDs), and each RSD includes a session parameter. When there is application data to be transmitted, the terminal device can use a parameter in an RSD to transmit a PDU session establishment request message to a network device. If the value of the session parameter transmitted by the terminal device is not supported by the network device, the network device can transmit a rejection message to the terminal device. After the terminal device receives the rejection message, how to perform next session-parameter selection to establish a PDU session has become an urgent problem to be solved.

SUMMARY

Implementations of the present disclosure provide methods for wireless communication, a terminal device, and a network device.

In a first aspect, a method for wireless communication is provided. The method includes: receiving, by a terminal device, a first message transmitted by a network device, where the first message includes a cause parameter; and ignoring or skip using, by the terminal device, a route selection descriptor (RSD) unsatisfying a cause-parameter condition according to the cause parameter. The cause-parameter condition includes at least one of: whether a rejection cause in the cause parameter indicates that a service and session continuity (SSC) mode is not supported, an allowed SSC mode in the cause parameter, or whether a combination of a data network name (DNN) and single-network slice selection assistant information (S-NSSAI) in a current RSD differs from a combination of a DNN and S-NSSAI used for initiation of a previous PDU session.

In a second aspect, a method for wireless communication is provided. The method includes transmitting, by a network device, a first message to a terminal device, where the first message includes a cause parameter, and the cause parameter is used by the terminal device to determine to ignore or skip using an RSD unsatisfying a cause-parameter condition. The cause-parameter condition includes at least one of: whether a rejection cause in the cause parameter indicates that an SSC mode is not supported, an allowed SSC mode in the cause parameter, or whether a combination of a DNN and S-NSSAI in a current RSD differs from a combination of a DNN and S-NSSAI used for initiation of a previous PDU session.

In a third aspect, a terminal device is provided. The terminal device includes a transceiver, a processor, and a memory storing a computer program which, when executed by the processor, causes the transceiver to receive a first message transmitted by a network device, where the first message includes a cause parameter. The computer program which, when executed by the processor, further causes the processor to ignore or skip using an RSD unsatisfying a cause-parameter condition according to the cause parameter. The cause-parameter condition includes at least one of: whether a rejection cause in the cause parameter indicates that an SSC mode is not supported, an allowed SSC mode in the cause parameter, or whether a combination of a DNN and S-NSSAI in a current RSD differs from a combination of a DNN and S-NSSAI used for initiation of a previous PDU session In a fourth aspect, a network device is provided. The network device includes a transceiver, a processor, and a memory storing a computer program which, when executed by the processor, causes the transceiver to transmit a first message to a terminal device, where the first message includes a cause parameter, and the cause parameter is used by the terminal device to determine to ignore or skip using an RSD unsatisfying a cause-parameter condition. The cause-parameter condition includes at least one of: whether a rejection cause in the cause parameter indicates that an SSC mode is not supported, an allowed SSC mode in the cause parameter, or whether a combination of a DNN and S-NSSAI in a current RSD differs from a combination of a DNN and S-NSSAI used for initiation of a previous PDU session.

DETAILED DESCRIPTION

Figure 1:
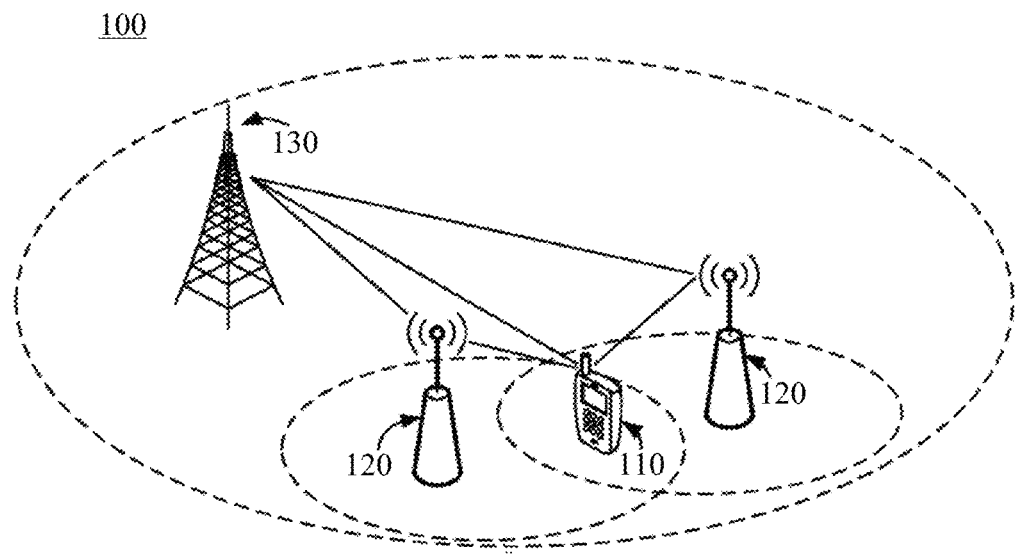
FIG. 1 is a schematic diagram illustrating a wireless communication system according to an implementation of the present disclosure.

FIG. 1 is a schematic diagram illustrating a system 100 according to an implementation of the present disclosure.

As illustrated in FIG. 1, a terminal device 110 is coupled to a first network device 130 in a first communication system and a second network device 120 in a second communication system. For example, the first network device 130 is a network device in a long term evolution (LTE) system, and the second network device 120 is a network device in a new radio (NR) system.

The first network device 130 and the second network device 120 may correspond to multiple cells.

It is to be understood that FIG. 1 illustrates an example of a communication system according to an implementation of the present disclosure, and the implementation of the present disclosure is not limited to that illustrated in FIG. 1.

As an example, the communication system according to the implementation of the present disclosure may at least include multiple network devices in the first communication system and/or multiple network devices in the second communication system.

For example, the system 100 illustrated in FIG. 1 may include one master network device in the first communication system and at least one secondary network device in the second communication system. The at least one secondary network device is connected to the master network device to form multi-connections, and is respectively connected to the terminal device 110 to serve the terminal device 110. The terminal device 110 can be connected to both the master network device and the at least one secondary network device.

The connection established between the terminal device 110 and the master network device may be a master connection, and the connection established between the terminal device 110 and the secondary network device may be a secondary connection. Control signaling from the terminal device 110 can be transmitted via the master connection, and data in the terminal device 110 can be transmitted via both the master connection and the secondary connection, or can be transmitted via only the secondary connection.

For another example, the first communication system and the second communication system in the implementation of the present disclosure are different, but there is no limitation on specific types of the first communication system and the second communication system.

For example, the first communication system and the second communication system may be various communication systems, such as a global system of mobile communication (GSM), a code division multiple access (CDMA) system, a wideband code division multiple access (WCDMA) system, a general packet radio service (GPRS), a long term evolution (LTE) system, LTE time division duplex (TDD), a universal mobile telecommunication system (UMTS), etc.

The master network device and the secondary network device may be any access network device.

In some implementations, the access network device may be a base transceiver station (BTS) in the GSM or WCDMA system, a NodeB (NB) in the WCDMA system, or an evolutional node B (eNB or eNodeB) in the LTE system.

The access network device may also be a next generation radio access network (NG RAN), or a next generation NB (gNB) in the NR system, or a radio controller in a cloud radio access network (CRAN), or the access network device may be a relay station, an access point, a vehicle-mounted device, a wearable device, or a network device in a future evolved public land mobile network (PLMN), etc.

In the system 100 illustrated in FIG. 1, as an example, the first network device 130 is taken as the master network device, and the second network device 120 is taken as the secondary network device.

The first network device 130 may be an LTE network device, and the second network device 120 may be an NR network device. Alternatively, the first network device 130 may be an NR network device, and the second network device 120 may be an LTE network device. Alternatively, both the first network device 130 and the second network device 120 may be NR network devices. Alternatively, the first network device 130 may be a GSM network device, a CDMA network device, or the like, and the second network device 120 may also be a GSM network device, a CDMA network device, or the like. Alternatively, the first network device 130 may be a macrocell, and the second network device 120 may be a microcell, a picocell, a femtocell, or the like.

The terminal device 110 may be any terminal device which can include but is not limited to a device configured to communicate via a wired line, another data connection/network, and/or a wireless interface, a device which is part of another terminal device and configured to receive/transmit communication signals, or an internet of things (IoT) device. Examples of the wired line may include, but are not limited to, a public switched telephone network (PSTN), a digital subscriber line (DSL), a digital cable, a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, an amplitude modulation-frequency modulation (AM-FM) broadcast transmitter. A terminal device configured to communicate via a wireless interface may be called a "wireless communication terminal", a "wireless terminal", and/or a "mobile terminal". Examples of a mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with a radio telephone, a pager, Internet/Intranet access, a web browser, a notebook, a calendar, and/or a global positioning system (GPS) receiver, and/or a conventional laptop, a handheld receiver, or other electronic devices equipped with a radio telephone receiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in a 5th generation (5G) network, a terminal device in the future evolved PLMN, etc.

It can be understood that in the specification the terms "system" and "network" are often used interchangeably.

In the 5G architecture, policy-related network elements are mainly a policy control function (PCF), an access and mobility management function (AMF), a session management function (SMF), an RAN, and a UE. The SMF is mainly responsible for execution of a policy-related session, and the AMF is mainly responsible for access of policy execution related to a UE policy. Policy delivery and update on the SMF and the AMF are both controlled by the PCF.

For a UE policy, between the PCF and the terminal device relevant information of the UE policy is monitored via a container, where the relevant information of the UE policy includes content of the UE policy, an identity of the UE policy, and so on. In an uplink direction, a container is transmitted to the AMF by the terminal device via a non-access stratum (NAS) message, and the AMF further transparently transmits (without perception or modification) the container to the PCF. On the contrary, in a downlink direction, the PCF transmits a container to the AMF, and the AMF then transparently transmits the container to the terminal device via an NAS message.

Figure 2:
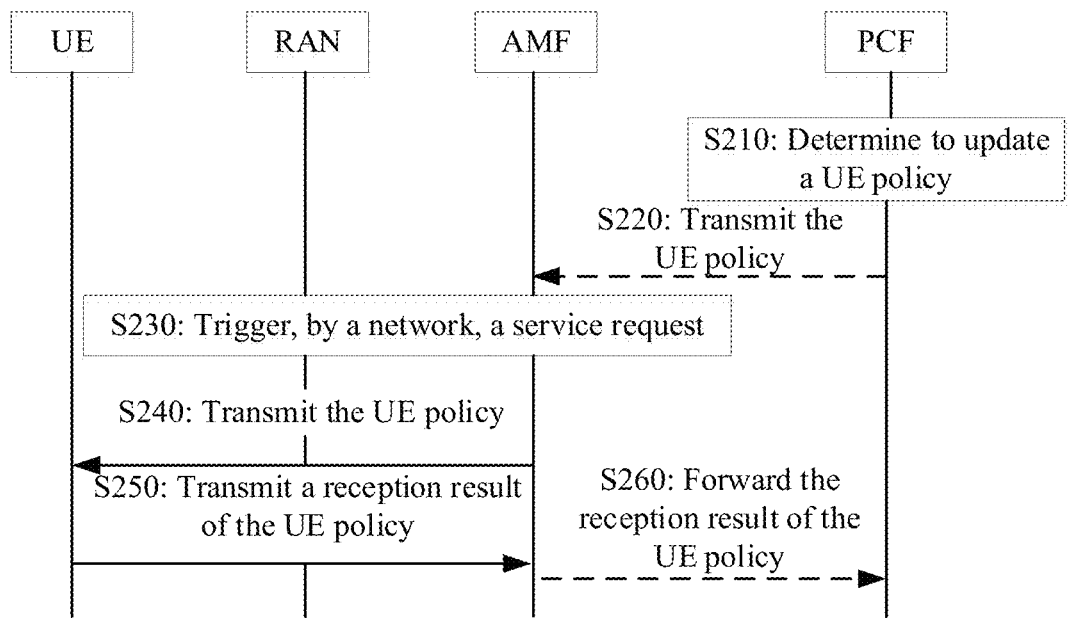
FIG. 2 is a schematic flow chart illustrating a method for transmitting a user equipment (UE) policy according to an implementation of the present disclosure.

Based on the above architecture, a UE policy is implemented via a UE configuration update process defined by 3rd generation partnership project (3GPP). As illustrated in FIG. 2, the PCF puts a policy to be updated in a container, and then transmits the container to the AMF, and the AMF forwards the policy to the terminal device via an NAS message.

A process illustrated in FIG. 2 includes operations at blocks S210 to S260.

At block S210, the PCF determines to update a UE policy.

At block S220, the PCF transmits the UE policy to the AMF via a container.

At block S230, a network triggers a service request.

At block S240, the AMF transmits the UE policy to the terminal device.

At block S250, the terminal device transmits a reception result of the UE policy to the AMF.

At block S260, the AMF forwards the reception result of the UE policy to the PCF.

To transmit the UE policy, a cause value of "UE policy container" is introduced in a downlink NAS message and an uplink NAS message, that is, in a payload container the cause value of "UE policy container" is added. The AMF performs transparent-transmission in response to discovering the cause value in the payload container.

The terminal device can obtain a UE policy from the PCF, and perform WLAN selection and UE route selection according to the UE policy.

Figure 3:
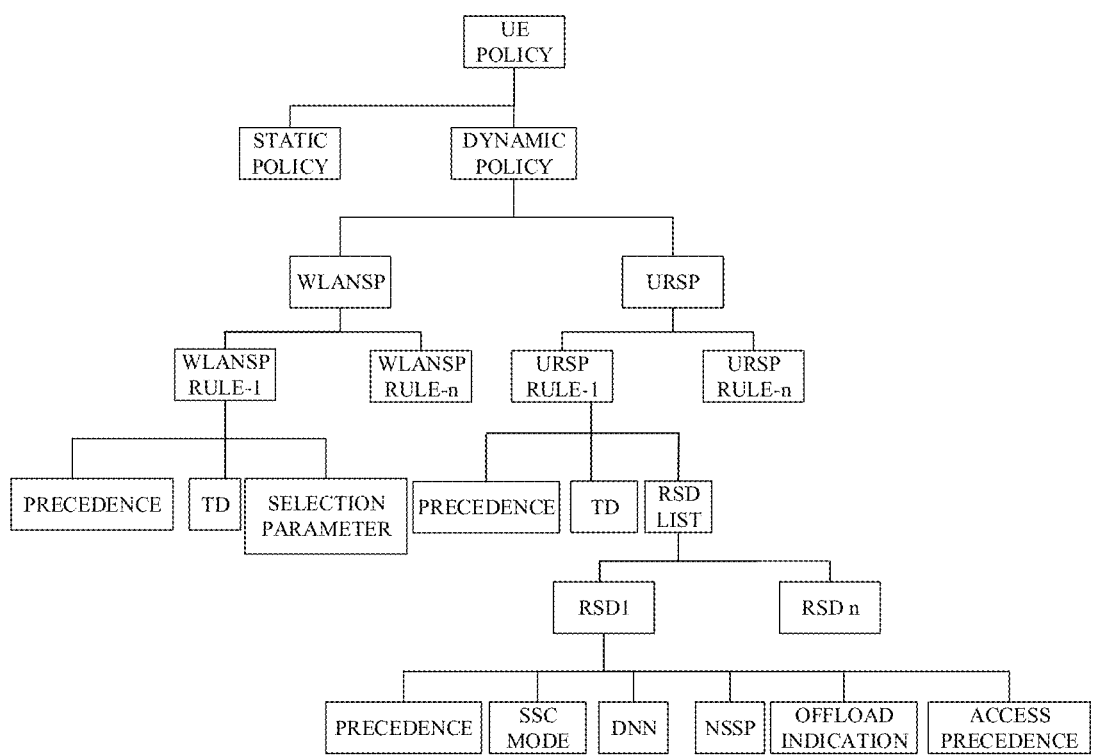
FIG. 3 is a schematic diagram illustrating a UE policy according to an implementation of the present disclosure.

In an implementation of the present disclosure, there is no limitation on specific content of the UE policy. As illustrated in FIG. 3, the UE policy may include a static policy and a dynamic policy. The dynamic policy may include a WLAN selection policy (WLANSP), an access network discovery and selection policy (ANDSP), and a UE route selection policy (URSP).

The WLANSP may include at least one WLANSP rule. As illustrated in FIG. 3, the WLANSP may include a WLANSP rule-1, . . . , a WLANSP rule-n, where n is a positive integer. One WLANSP rule may include, for example, a precedence of the WLANSP, a traffic descriptor (TD) in the WLANSP rule, a selection parameter in the WLANSP rule, etc. The terminal device can perform the WLAN selection according to at least one WLANSP rule. For example, the terminal device can perform the WLAN selection in a precedence order of WLANs, and the terminal device can preferentially select a WLAN with a relatively high precedence.

The URSP may include at least one URSP rule. As illustrated in FIG. 3, the URSP may include a URSP rule-1, . . . , a URSP rule-n, where n is a positive integer. One URSP rule may include a precedence of the URSP rule, a TD in the URSP rule, a route selection descriptor (RSD) list in the URSP rule, etc. Each TD may correspond to one RSD list, which is used for the terminal device to select to use parameters in the RSD list to determine a binding relationship between an application corresponding to the TD and a session, or to determine what PDU session the terminal device can establish to satisfy the binding relationship.

The terminal device can select a route for an application according to at least one URSP rule, that is, bind different applications to sessions with different attribute parameters for data transmission. An RSD list includes a session attribute parameter and other route-related parameters, for example, may include at least one of the following: a precedence of the RSD, a session and service continuity (SSC) mode, a data network name (DNN), a network slice selection policy (NSSP), a non-seamless offload indication, an access precedence, etc. The NSSP may include one piece of or more pieces of single network slice selection assistance information (S-NSSAI). The S-NSSAI may or may not have a precedence.

The TD in the URSP can be used to describe a specific traffic. For example, a microblog traffic can be described via internet protocol (IP)@1-9, and another example is that an IP multimedia subsystem (IMS) traffic can be described with an IMS DNN. Each TD may correspond to one or more RSDs. In one RSD, the S-NSSAI and the DNN may have one or more values, and other parameters each only have one value. One value of the S-NSSAI and the DNN can be combined with the values of the other parameters to constitute a parameter combination. Therefore, each RSD can correspond to one or more parameter combinations, each parameter combination constitutes features of a PDU session, and traffic data corresponding to the TD can be transmitted via a PDU session corresponding to a parameter combination in the RSD. When an application data stream with a TD appears, the terminal device can select a parameter combination according to component values in a corresponding RSD, and initiate a PDU session establishment request to the network device via the parameter combination.

It can be understood that values of parameters in different RSDs may be the same or different.

Certainly, if the parameter combination selected can match a PDU session established, the terminal device can bind application data to the PDU session, that is, the terminal device can transmit the application data via the PDU session.

A scheme in which the terminal device associates, based on the URSP, an application to a corresponding PDU session for transmission is as follows. When data appears at an application layer, the terminal device uses the URSP rules in the URSP to check whether features of the application data match a TD in one URSP rule, and the order of checking can be determined according to a precedence of each TD in each URSP rule, that is, the terminal device checks matching in the precedence order of the TDs. When the application data matches one URSP rule, an RSD list in the URSP rule is used to perform PDU session binding.

Figure 4:
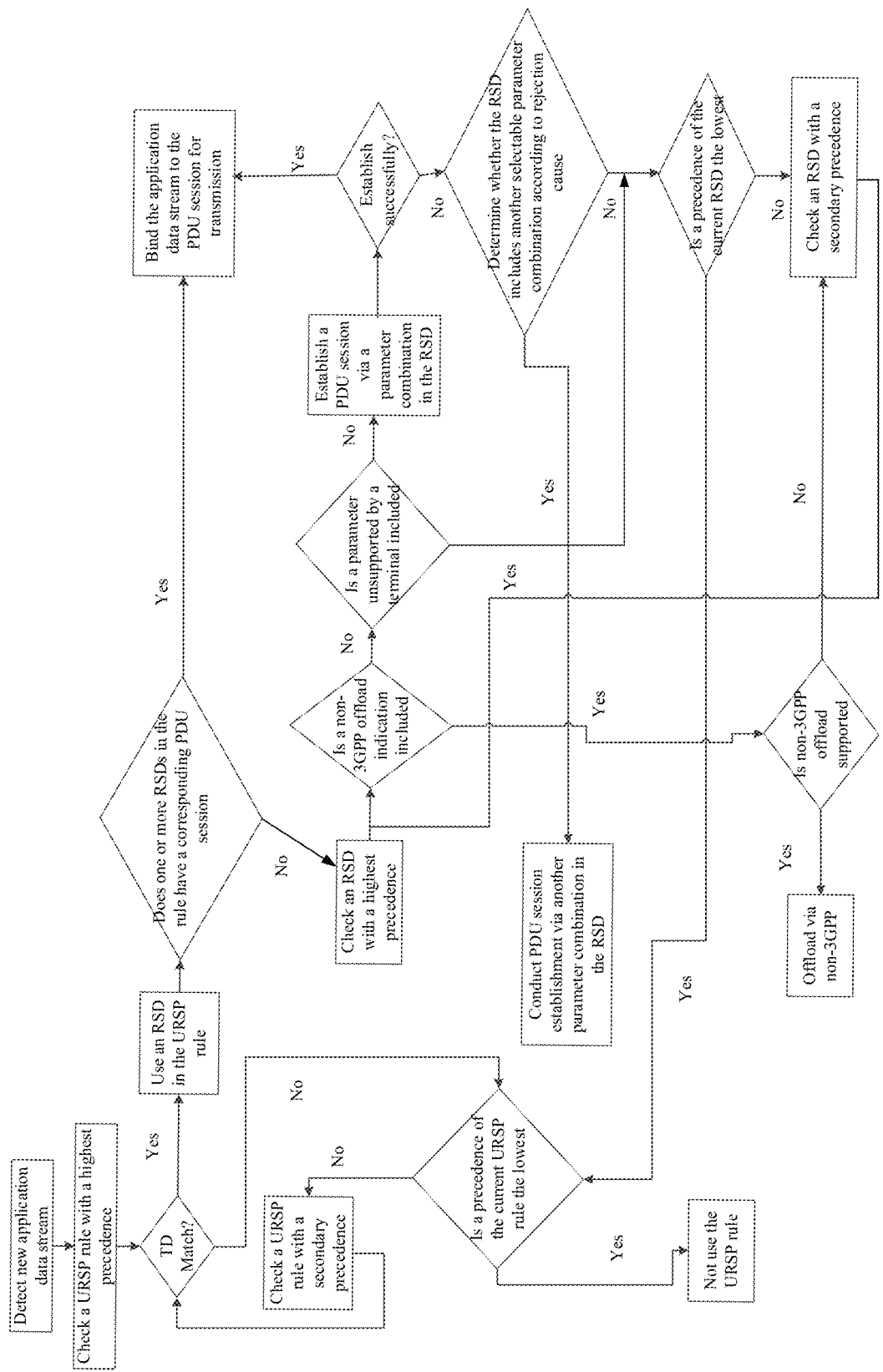
FIG. 4 is a schematic diagram illustrating an evaluation process according to an implementation of the present disclosure.

In an evaluation behavior illustrated in FIG. 4, when a new application data stream is detected, the terminal device can check a URSP rule with a highest precedence to determine whether the URSP rule with the highest precedence can match the application data stream. If the URSP rule can match the application data stream, the terminal device can use an RSD in the URSP rule and perform the following. If the URSP cannot match the application data, the terminal device can check a URSP rule with a secondary precedence, and so on, until a URSP rule with a lowest precedence is checked. If the URSP rule with the lowest precedence cannot match the application data stream, the URSP rule cannot be applied to the terminal device.

According to an implementation of the present disclosure, detailed content of a URSP rule is illustrated in table 1 and table 2. Table 1 illustrates a URSP rule, and table 2 illustrates an RSD list.

TABLE 1

| Information name | Description | Policy | PCF permitted to modify in a UE context | Scope |
| --- | --- | --- | --- | --- |
| Rule precedence | Determine the order in which the URSP rule is enforced in the UE | Mandatory (Note 1) | Yes | UE context |
| Traffic descriptor | This part defines the traffic descriptor for the policy | | | |
| Application descriptors | Application descriptors | Optional | Yes | UE context |
| IP descriptors | IP 3 tuples (Target IP address or IPv6 network prefix, target port number, protocol ID of the protocol above IP) | Optional | Yes | UE context |
| Non-IP descriptors | Descriptors of non-IP traffic | Optional | Yes | UE context |
| RSD list | A list of route selection descriptors | Mandatory | | |

(Note 1):
URSP rules have different precedence.

According to an implementation of the present disclosure, detailed content of an RSD list is illustrated in FIG. 2.

TABLE 2

| Information name | Description | Policy | PCF permitted to modify in a UE context | Scope |
| --- | --- | --- | --- | --- |
| RSD precedence | Determine the order in which route selection descriptors are to be applied. | Mandatory (Note 1) | Yes | UE context |
| Route selection component | This part defines route selection components | Mandatory (Note 2) | | |
| SSC mode selection | One single value of an SSC mode | Optional | Yes | UE context |
| Network slice selection | Either a single value or a list of values of S-NSSAI(s) | Optional | Yes | UE context |
| DNN selection | Either a single value or a list of values of DNN(s). | Optional | Yes | UE context |
| Non-seamless offload indication | Indicate if the traffic of the matching application is to be offloaded to non-3GPP access outside of a PDU session. | Optional (Note 3) | Yes | UE context |

TABLE 2-continued

| Information name | Description | Policy | PCF permitted to modify in a UE context | Scope |
| --- | --- | --- | --- | --- |
| Access type preference | Indicate the preferred access type (3GPP or non-3GPP or multi-access) when the UE establishes a PDU session for the matching application | Optional | Yes | UE context |

(Note 1):
Route selection descriptors in the list have different precedence.
(Note 2):
Include at least one route selection component.
(Note 3):
If the RSD includes the indication, it indicates that the RSD does not include other components.

When a URSP rule matches application data, the terminal device can perform the following.

1) The terminal device first checks whether a currently established PDU session is established via a valid RSD parameter in the matching URSP rule, and if any, bind the matching application data to the PDU session for transmission.

2) If not, the terminal device can establish a PDU session in a precedence order of valid RSDs. Parameters in an RSD with a highest precedence are first used to establish a PDU session. If a certain parameter in the RSD has one or more values, the terminal device selects one value from the value or values of the parameter and combines the selected value and another parameter to perform PDU session establishment.

If a PDU session is successfully established, the terminal device binds the application data to the PDU session for transmission.

If no PDU session is established, the terminal device can attempt to perform PDU session establishment according to another parameter combination in the RSD or by checking a parameter combination in an RSD with a secondary precedence.

If no suitable PDU session for binding can be found or established via the matching URSP rule, the terminal device can check, in the precedence order of the URSP rules, whether a TD in the URSP rule with the secondary precedence can match the features of the application data stream, and if any, the terminal device repeats the above process. The whole evaluation process is illustrated in FIG. 4.

The above process of finding a suitable PDU session for the application can be referred to as an evaluation process, i.e., finding or establishing a suitable PDU session for binding. An RSD in the URSP rule used by the terminal device can be taken as a valid RSD and can be used to perform the above evaluation process only if the following conditions are met.

1. If the RSD includes the S-NSSAI, the S-NSSAI shall belong to an allowed NSSAI in a non-roaming scenario or a mapping of an allowed NSSAI in a roaming scenario.

2. If the RSD includes the DNN and the DNN is a name of a local area data network (LADN), the terminal device shall be in an effective area corresponding to the LADN.

3. If the RSD includes an access type preference and the access type preference is set to be multi-access, the terminal device shall support an access traffic steering, switching, splitting (ATSSS) function.

4. If the RSD includes a timer window and location criteria, the terminal device shall meet required time and location conditions.

Otherwise, if the RSD is not a valid RSD, the terminal device does not use the RSD for data-stream binding or PDU session establishment. For example, in the above process, the terminal device just considers the valid RSD or ignores an invalid RSD.

According to the scheme for the above evaluation process, the terminal device can apply for PDU session establishment again according to an RSD parameter, in response to initiation of PDU session establishment being rejected.

Figure 5:
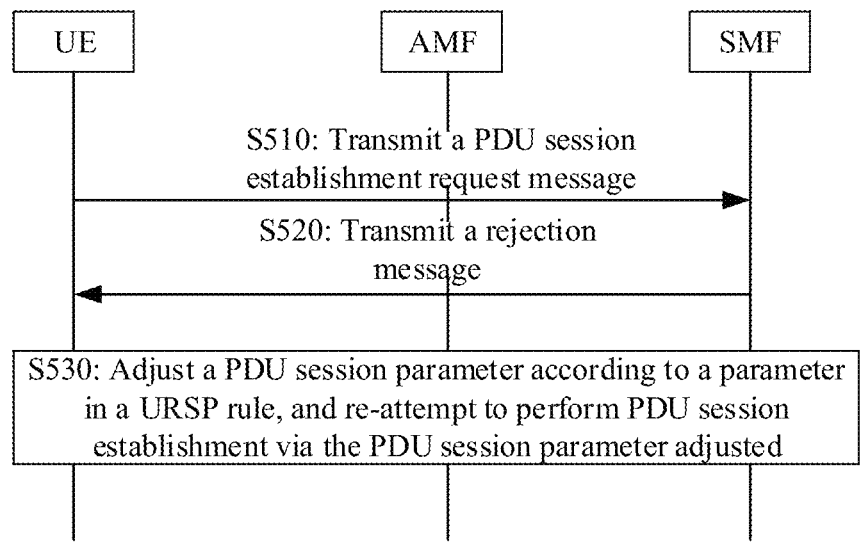
FIG. 5 is a schematic flow chart illustrating a method for establishing a protocol data unit (PDU) session according to an implementation of the present disclosure.

As illustrated in FIG. 5, the terminal device can transmit a PDU session establishment request message to the SMF. The PDU session establishment request message can carry a PDU session parameter. The PDU session parameter is a parameter combination selected by the terminal device. The PDU session parameter can include at least one of the following: the DNN, the S-NSSAI, a PDU session type, the SSC mode, a PDU session identity, and an access type.

A method illustrated in FIG. 5 can include operations at blocks S510 to S530.

At block S510, the terminal device transmits the PDU session establishment request message to the SMF, where the PDU session establishment request message may include the PDU session parameter.

At block S520, the SMF transmits a rejection message to the terminal device, where the rejection message may carry a rejection cause.

At block S530, the terminal device adjusts the PDU session parameter according to a parameter in a URSP rule, and re-attempts to perform PDU session establishment via the PDU session parameter adjusted.

If the network device does not support a certain parameter selected by the terminal device, the network device can transmit the rejection message to the terminal device, and the rejection message may carry the rejection cause. The terminal device can adjust a parameter combination according to a parameter in an RSD in the URSP rule. For example, the terminal device can initiate a PDU session establishment request according to another parameter combination in the same RSD in the URSP rule or a parameter in an RSD with a secondary precedence in the URSP rule.

The above scheme has the following problems. If an unsupported parameter indicated in the rejection cause is also included in the RSD with the secondary precedence and the RSD with the secondary precedence does not have a corresponding established PDU session, then even if the terminal device selects the RSD with the secondary precedence, not only no PDU session can be established, but also signaling interaction burden is increased, which is not conducive to saving signaling overhead, and also increases time of the evaluation process performed by the terminal device.

For example, if the terminal device uses an RSD-1 having a highest precedence to perform PDU session establishment, a value of the PDU session type in the RSD-1 is IPv4, and the network device rejects the PDU session establishment because "an IPv4 address is unsupported", then the terminal device can use an RSD in which a value of the PDU session type is not the IPv4 to successfully establish a PDU session. However, if a value of the PDU session type in an RSD-2 with a secondary precedence is still the IPv4, the terminal device shall not use the RSD-2, and shall jump to an RSD in which the value of the PDU session type is not or is not limited to the IPv4. However, according to the current scheme, the terminal device tries to establish a PDU session in the precedence order of the URSP rules and the precedence order of the RSDs. In other words, even if the value of the PDU session type in the RSD-2 is the IPv4, the terminal device still uses a parameter combination in the RSD-2 to initiate PDU session establishment to the network device.

For another example, the terminal device uses the RSD-1 with the highest precedence to perform PDU session establishment. A value of the SSC mode in the RSD-1 is an SSC mode-3, and the network device rejects the PDU session establishment because "the SSC mode-3 is unsupported", and indicates that an allowed value of the SSC mode is "SSC mode=1" (i.e., SSC mode-1), and thus the terminal device jumps, in the precedence order of the RSDs, to an RSD including "SSC mode=1" or an RSD in which a value of the SSC mode is not limited, instead of directly trying to use the RSD with the secondary precedence.

Figure 6:
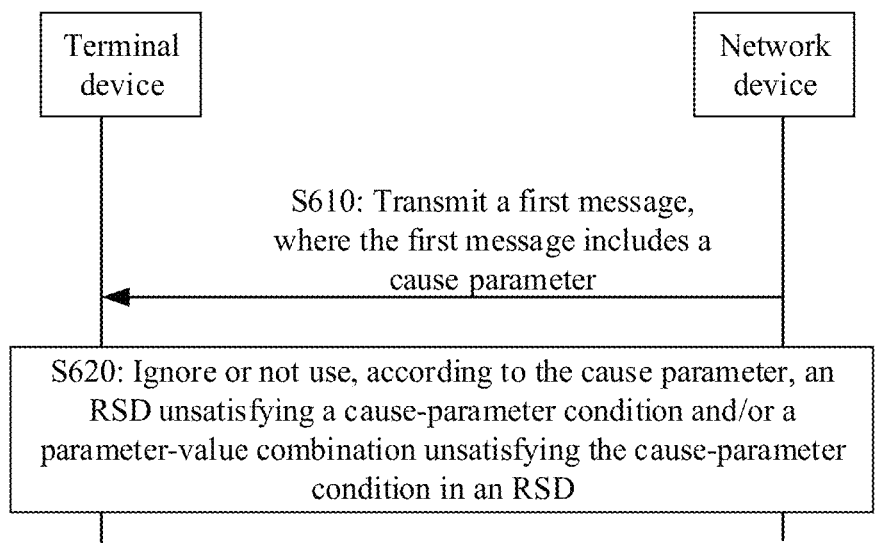
FIG. 6 is a schematic flow chart illustrating a method for wireless communication according to an implementation of the present disclosure.

According to an implementation of the present disclosure, a method for wireless communication is provided. According to the method, a possibility of successfully establishing a PDU session by a terminal device is increased, and time for evaluation performed by the terminal device is reduced. According to the method, in response to a network device rejecting a session establishment request initiated by the terminal device, the network device can find a suitable session parameter for the terminal device as soon as possible to perform data transmission. As illustrated in FIG. 6, the method includes operations at blocks S610 to S620.

At block S610, the network device transmits a first message to the terminal device, where the first message includes a cause parameter.

For example, the first message may be a reply transmitted from the network device to the terminal device after the terminal device transmits a PDU session establishment or modification request message to the network device, that is, the first message is a reply message corresponding to the PDU session establishment or modification request message. For another example, before the terminal device transmits the PDU session establishment or modification request message to the network device, the network device can also actively transmit the first message to the terminal device according to situations of the network device.

For example, under a condition where there is first application data stream to be transmitted, the terminal device can transmit the PDU session establishment or modification request message to the network device. In addition, the PDU session establishment or modification request message may include a value combination of a first parameter. The first parameter may include at least one of the following parameters: an SSC, an S-NSSAI, a DNN, a PDU session type, and an access type.

A value of the first parameter is a value of a parameter in an RSD in a URSP rule that matches the first application data stream. For ease of description, URSP rules involved in the following all refer to URSP rules that match the first application data stream.

For example, the value of the first parameter is a value of a parameter in an RSD in a URSP rule with a highest precedence. For another example, the value of the first parameter is a value of a parameter in an RSD with a highest precedence in the URSP rule with the highest precedence.

If the network device does not support a value of a certain parameter in the first parameter or does not support a combination of values of multiple parameters in the first parameter, the network device can transmit the first message to the terminal device, where the first message may carry the cause parameter. The cause parameter may indicate a value of a second parameter unsupported by the network device and/or a value of a third parameter allowed by the network device.

In an implementation, the first message may be referred to as a rejection message.

The cause parameter may include one or more parameters. For example, the cause parameter includes a rejection cause, where the rejection cause indicates a value of a parameter not allowed by the network device and a value of a parameter allowed by the network device. For another example, the cause parameter may include the rejection cause and an allowed SSC mode. The rejection cause indicates the value of the parameter allowed by the network device, and the allowed SSC mode may indicate the value of the SSC mode allowed by the network device.

The second parameter and the third parameter may include at least one of the following: the DNN, the S-NSSAI, the PDU session type, the SSC mode, the PDU session identity, and the access type. The second parameter and the third parameter may be the same or different.

The second parameter may include one parameter or multiple parameters. The third parameter may include one parameter or multiple parameters.

An unsupported parameter value indicated by the network device may be a value of one parameter or values of multiple parameters in an RSD. For example, the rejection cause may indicate that the SSC mode, the S-NSSAI, the DNN, the PDU session type, the access type and/or the like requested in the PDU session establishment or modification request message are not supported. The network device may indicate a single parameter value unsupported or a combination of multiple parameter values unsupported, for example, a DNN-1 and an S-NSSAI-1 cannot be requested simultaneously in the request message.

Similarly, an allowed parameter value indicated by the network device may also be a value of one parameter or values of multiple parameters in an RSD. For example, a parameter value recommended or allowed by the network device may be a value of one parameter or values of more parameters among the DNN, the S-NSSAI, the PDU session type, the SSC mode, the PDU session identity, and the access type. The network device can indicate a single parameter value allowed or a combination of multiple parameter values allowed.

For example, the cause parameter may indicate that a value of the SSC mode unsupported is an SSC mode-1, and a value of the SSC mode allowed is an SSC mode-2. For another example, the cause parameter may indicate that the value of the SSC mode unsupported is the SSC mode-1, and a value of the PDU session type allowed is IPv6.

At block S620, the terminal device ignores or does not use, according to the cause parameter, an RSD unsatisfying a cause-parameter condition and/or a parameter-value combination unsatisfying the cause-parameter condition in an RSD.

An RSD can be pre-configured in the terminal device, or the RSD can be configured for the terminal device together with the first message, that is, the network device can transmit the first message to the terminal device together with configuration information of the RSD. The configuration information of the RSD may include a value of each parameter in the RSD.

An RSD that satisfies the cause-parameter condition includes at least one of the following: an RSD in which a value of the second parameter includes another value besides the value unsupported by the network device, an RSD in which the second parameter is not included, an RSD in which a value of the third parameter includes the value allowed by the network device, and an RSD in which the third parameter is not included.

It can be understood that other than the RSD satisfying the cause-parameter condition, any of other RSDs is one RSD that does not satisfy the cause-parameter condition.

A parameter-value combination in the RSD satisfying the cause-parameter condition may refer to a parameter-value combination satisfying the cause-parameter condition in the RSD.

As an example, the terminal device can determine, according to the cause parameter, the RSD satisfying the cause-parameter condition and/or the parameter-value combination in the RSD satisfying the cause-parameter condition.

For an RSD, if a parameter (i.e., component) in the RSD only has one value and the value of the parameter in the RSD does not satisfy an indication in the cause parameter, the RSD is determined to be an RSD not satisfying the cause-parameter condition, otherwise the RSD is determined be an RSD satisfying the cause-parameter condition.

For determining a parameter-value combination in an RSD satisfying the cause-parameter condition, if a parameter (i.e., component) in the RSD has multiple values, some values of the parameter in the RSD do not satisfy the indication in the cause parameter, and other than the values of the parameter unsatisfying the indication in the cause parameter, other parameter values satisfy the cause-parameter condition, then a combination of the parameter values satisfying the cause-parameter condition is the parameter-value combination satisfying the cause-parameter condition in the RSD.

For example, the cause parameter indicates that the SSC mode-1 is not supported. If a parameter in an RSD-1 includes the SSC mode, and the SSC mode has only one value which is the SSC mode-1, then the RSD does not satisfy the cause-parameter condition.

For another example, the cause parameter indicates that the SSC mode-1 is not supported. If a parameter in an RSD-2 includes the SSC mode, and the SSC mode has two values which are the SSC mode-1 and the SSC mode-2, then a combination of the SSC mode 2 and a value of another parameter in the RSD-2 is a parameter-value combination that satisfies the cause-parameter condition.

In the process of data binding or PDU session establishment, the terminal device can transmit a second message to the network device via a fourth parameter or a value combination of the fourth parameter in the RSD satisfying the cause-parameter condition, where the second message is used for requesting PDU session establishment or modification.

The fourth parameter or the value combination of the fourth parameter satisfies at least one of the following conditions: the fourth parameter does not include the second parameter, a value of the second parameter in the fourth parameter does not include the value unsupported by the network device, the fourth parameter does not include the third parameter, and a value of the third parameter in the fourth parameter includes the value allowed by the network device. In other words, the value combination of the fourth parameter satisfies the cause-parameter condition.

The fourth parameter may include at least one of the following: the SSC, the S-NSSAI, the DNN, the PDU session type, and the access type.

When determining the RSD that satisfies the cause-parameter condition, the terminal device can determine the RSD satisfying the cause-parameter condition and/or the parameter-value combination in the RSD satisfying the cause-parameter condition in a precedence order of URSP rules and/or RSDs. That is, the terminal device can use, in the precedence order of the URSP rules and/or RSDs, the fourth parameter or the value combination of the fourth parameter in the RSD satisfying the cause-parameter condition to transmit the second message to the network device. The terminal device performs the subsequent evaluation process by considering the RSD satisfying the cause-parameter condition and/or the parameter-value combination in the RSD satisfying the cause-parameter condition.

In an implementation, in response to failing to initiate a PDU session establishment request based on a parameter value in the RSD-1, the terminal device determines, according to the indication in the cause parameter in the rejection message, the RSD satisfying the cause-parameter condition and/or the parameter-value combination in the RSD satisfying the cause-parameter condition. The terminal device can check, in the precedence order of the URSP rules and the precedence order of the RSDs, whether the current RSD includes a value combination of the fourth parameter that satisfies the cause-parameter condition and is unused. If any, the terminal device uses the value combination of the fourth parameter in the RSD satisfying the cause-parameter condition to initiate PDU session establishment, otherwise, the terminal device checks whether an RSD with a next precedence includes a non-third-generation partnership project (non-3GPP) offload indication or a parameter value unsupported by the terminal device (the parameter unsupported may be a parameter which has only one value, such as the PDU session type that has only one value or the SSC mode that has only one value) is included. If the RSD with the next precedence does not include the non-3GPP offload indication or does not include the parameter value unsupported by the terminal device or some parameter values can be supported by the terminal device, and the RSD satisfies the cause-parameter condition, the terminal device can use the parameter-value combination in the RSD to initiate PDU session establishment. If the RSD with the next precedence does not satisfy the cause-parameter condition, the terminal device skips the RSD and checks an RSD with a lower priority in the URSP rule, or if the RSD is an RSD with the lowest precedence in the URSP rule, the terminal device can check an RSD in a URSP rule with a next precedence.

It is to be noted that if an RSD includes the non-3GPP offload indication or one parameter value or more parameter values unsupported by the terminal device (the unsupported parameters may be those parameters that only have one value, such as the session type that has only one value and the SSC mode that has only one value), the terminal device does not use the RSD to establish a PDU session, and checks another RSD in the precedence order of the RSDs.

For example, suppose that the UE is configured with a URSP rule-1 with a highest precedence and a URSP rule-2 with a secondary precedence. The URSP rule-1 is illustrated in table 3.

TABLE 3

URSP Rule-1
Precedence = 1

Traffic Descriptor: target address = 10.10.10.10
RSD List: RSD-1, RSD-2, RSD-3

RSD-1
Precedence = 1

| | |
|---|---|
| SSC Mode | SSC Mode = 1 |
| DNN | DNN = 1 |
| Network Slice Selection | S-NSSAI 1, S-NSSAI 2 |
| PDU Session Type | IPv4 |

RSD-2
Precedence = 2

| | |
|---|---|
| SSC Mode | SSC Mode = 1 |
| Network Slice Selection | S-NSSAI 1, S-NSSAI 2 |
| PDU Session Type | IPv4 |

RSD-3
Precedence = 3

| | |
|---|---|
| SSC Mode | SSC Mode = 2 |
| DNN | DNN = 3 |
| Network Slice Selection | S-NSSAI 1 |
| PDU Session Type | IPv6 |

When the UE detects a new data stream (a target address is 10.10.10.10), the UE can check whether the new data stream can match a URSP rule in the precedence order of the URSP rules (a URSP rule with a lower precedence being preferentially checked). Here, the new data stream matches the URSP rule-1, where a target address in a traffic descriptor in the URSP rule-1 is 10.10.10.10. Then the UE checks whether all RSDs in the URSP rule-1 have corresponding established PDU sessions, that is, checks whether parameter combinations in the RSD-1 and the RSD-2 have corresponding established PDU sessions, where the precedence of the RSD-1 is higher than that of the RSD-2. If the parameter combinations in the RSD-1 and the RSD-2 have corresponding established PDU sessions, bind the data stream to one of the established PDU sessions, i.e., the terminal device binds the data stream to one established PDU session. If parameters in multiple RSDs have corresponding established PDU sessions, the terminal device binds the data stream to a PDU session corresponding to the RSD with the highest precedence. For example, if the parameter combinations in the RSD-1 and the RSD-2 have corresponding established PDU sessions, respectively, the terminal device can bind the data stream to the PDU session corresponding to the RSD-1. If none of the RSDs in the URSP rule-1 has a corresponding established PDU session, the terminal device uses a value combination of parameters (the SSC mode-1, the DNN-1, the S-NSSAI 2, and the IPv4) in the RSD-1 with the highest precedence to initiate PDU session establishment (put the value combination in the PDU session request message). If the network device rejects the request, the rejection cause can be indicated in the cause parameter replied by the network device, as described below.

1) If it indicates that the SSC mode-1 is not supported, the UE determines that the current RSD-1 does not satisfy the cause-parameter condition, and then the UE checks the RSD-2 in the precedence order of the RSDs. If the RSD-2 does not have a corresponding established PDU session and a value of the SSC mode in the RSD-2 is the SSC mode-1, the UE further checks an RSD-3. If the RSD-3 also does not have a corresponding an established PDU session, but since a value of the SSC mode in the RSD-3 is the SSC mode-2, it is determined that the RSD-3 satisfies the cause-parameter condition, and thus the UE can use a parameter-value combination in the RSD-3. The terminal device can then use the parameter-value combination in the RSD-3 to initiate a PDU session establishment.

2) If it indicates that only IPv6 is supported, the UE determines that the current RSD-1 does not satisfy the cause-parameter condition, then the UE checks the RSD-2 in the precedence order of the RSDs. If the RSD-2 does not have a corresponding established PDU session, and a value of the PDU session type in the RSD-2 is IPv4, the UE further checks the RSD-3. If the RSD-3 also does not have a corresponding established PDU session, but since a value of the PDU session type in the RSD-3 is IPv6, it can be determined that the RSD-3 satisfies the cause-parameter condition, and thus a parameter-value combination in the RSD-3 can be used. The terminal device can use the parameter-value combination in the RSD-3 to initiate PDU session establishment.

3) If it indicates that S-NSSAI 2 is not supported, the UE eliminates the S-NSSAI 2 from the RSD-1, and uses only a parameter-value combination of the S-NSSAI 1 and a value of another parameter to initiate PDU session establishment.

4) If it indicates that DNN-1 is not supported, the UE determines that the current RSD-1 does not satisfy the cause-parameter condition, then the UE checks the RSD-2 in the precedence order of the RSDs. The RSD-2 does not have a corresponding established PDU session, but since the RSD-2 does not include a value of the DNN (i.e., the DNN is not limited), the RSD-2 satisfies the cause-parameter condition, and thus the UE can use a parameter-value combination in the RSD-2 to initiate PDU session establishment.

5) If it indicates that a value of the PDU session type allowed is Ethernet, and the UE checks that both the RSD-1 and the RSD-2 do not have a corresponding established PDU session, the UE checks a URSP rule-2 with a secondary precedence (not illustrated). If an RSD with a highest precedence in the URSP rule-2 has a corresponding established PDU session, the application data stream is bound to the PDU session for transmission.

The above cases are independent examples, and they are not necessarily related to each other. Different cases can be implemented separately or in combination with each other, which is not limited in the implementation of the present disclosure.

It is to be noted that all the RSDs involved in the above evaluation process do not include the non-3GPP offload indication and the parameter unsupported by the terminal device (such as a value of the PDU session type, the SSC mode, the access type and the like that are not supported by the terminal device). If the RSD currently checked includes the non-3GPP offload indication, the UE checks whether the RSD supports transmission of the application data stream through non-3GPP access. If so, conduct the transmission, otherwise, the terminal device skips the RSD and checks an RSD with a next precedence.

In addition, the network device can transmit a new cause parameter to the terminal device in case that re-initiated PDU session establishment fails. The terminal device can then repeat the above process according to the new cause parameter or the previous cause parameter (perform further RSD check in the precedence order of the RSDs, and there is no need to go back to the RSD with the highest precedence).

In an implementation of the present disclosure, a cause parameter in the current specification can be used as the cause parameter, or a new cause parameter can be redefined. As illustrated in table 4, table 4 illustrates rejection cause in the 5G system.

including the value of the PDU session type rejected, or eliminate the value of the PDU session type rejected from an RSD in which the PDU session type has multiple values.

If the cause value received by the terminal device is "00110010", it means that the network device only allows the value of the PDU session type which is the IPv4, and the terminal device only uses an RSD including the IPv4.

If the cause value received by the terminal device is "00110011", it means that the network device only allows the value of the PDU session type which is the IPv6, and the terminal device only uses an RSD including the IPv6.

If the cause value received by the terminal device is "01000011" or "01000110", it means that a combination of the value of the DNN and the value of the S-NSSAI transmitted by the terminal device to the network device is not suitable, and the terminal device will not use an RSD

TABLE 4

Cause value Bits

| 8 | 7 | 6 | 5 | 4 | 3 | 2 | 1 | |
|---|---|---|---|---|---|---|---|---|
| 0 | 0 | 0 | 1 | 1 | 0 | 1 | 0 | Insufficient resources |
| 0 | 0 | 0 | 1 | 1 | 0 | 1 | 1 | Missing or unknown DNN |
| 0 | 0 | 0 | 1 | 1 | 1 | 0 | 0 | Unknown PDU session type |
| 0 | 0 | 0 | 1 | 1 | 1 | 0 | 1 | User authentication or authorization failed |
| 0 | 0 | 0 | 1 | 1 | 1 | 1 | 1 | Request rejected, unspecified) |
| 0 | 0 | 1 | 0 | 0 | 0 | 1 | 0 | Service option temporarily out of order |
| 0 | 0 | 1 | 0 | 0 | 0 | 1 | 1 | PTI already in use |
| 0 | 0 | 1 | 0 | 0 | 1 | 0 | 0 | Regular deactivation |
| 0 | 0 | 1 | 0 | 0 | 1 | 1 | 1 | Reactivation requested |
| 0 | 0 | 1 | 0 | 1 | 0 | 0 | 1 | Invalid PDU session identity |
| 0 | 0 | 1 | 0 | 1 | 1 | 0 | 0 | Semantic errors in packet filter(s) |
| 0 | 0 | 1 | 0 | 1 | 1 | 0 | 1 | Syntactical error in packet filter(s) |
| 0 | 0 | 1 | 0 | 0 | 1 | 1 | 0 | Out of LADN service area |
| 0 | 0 | 1 | 0 | 1 | 1 | 1 | 1 | PTI mismatch |
| 0 | 0 | 1 | 1 | 0 | 0 | 1 | 0 | PDU session type IPv4 only allowed |
| 0 | 0 | 1 | 1 | 0 | 0 | 1 | 1 | PDU session type IPv6 only allowed |
| 0 | 0 | 1 | 1 | 0 | 1 | 1 | 0 | PDU session does not exist |
| 0 | 1 | 0 | 0 | 0 | 0 | 1 | 1 | Insufficient resources for specific slice and DNN |
| 0 | 1 | 0 | 0 | 0 | 1 | 0 | 0 | Not supported SSC mode |
| 0 | 1 | 0 | 0 | 0 | 1 | 0 | 1 | Insufficient resources for specific slice |
| 0 | 1 | 0 | 0 | 0 | 1 | 1 | 0 | Missing or unknown DNN in a slice |
| 0 | 1 | 0 | 1 | 0 | 0 | 0 | 1 | Invalid PTI value |
| 0 | 1 | 0 | 1 | 0 | 0 | 1 | 0 | Maximum data rate per UE for user-plane integrity protection is too low |
| 0 | 1 | 0 | 1 | 0 | 0 | 1 | 1 | Semantic error in the QoS operation |
| 0 | 1 | 0 | 1 | 0 | 1 | 0 | 0 | Syntactical error in the QoS operation |
| 0 | 1 | 0 | 1 | 1 | 1 | 1 | 1 | Semantically incorrect message |
| 0 | 1 | 1 | 0 | 0 | 0 | 0 | 0 | Invalid mandatory information |
| 0 | 1 | 1 | 0 | 0 | 0 | 0 | 1 | Message type non-existent or not implemented |
| 0 | 1 | 1 | 0 | 0 | 0 | 1 | 0 | Message type not compatible with the protocol state |
| 0 | 1 | 1 | 0 | 0 | 0 | 1 | 1 | Information element non-existent or not implemented |
| 0 | 1 | 1 | 0 | 0 | 1 | 0 | 0 | Conditional IE error |
| 0 | 1 | 1 | 0 | 0 | 1 | 0 | 1 | Message not compatible with the protocol state |
| 0 | 1 | 1 | 0 | 1 | 1 | 1 | 1 | Protocol error, unspecified |

Any other value received by the UE shall be treated as "0010 0010", "service option temporarily out of order". Any other value received by the network shall be treated as "0110 1111", "protocol error, unspecified".

If the cause value received by the terminal device is "00011011", it means that a value of the DNN transmitted by the terminal device to the network device is not suitable, and the terminal device reselects a suitable value of the DNN. The terminal device will no longer use an RSD including the value of the DNN rejected, or eliminate the value of the DNN rejected from an RSD in which the DNN has multiple values.

If the cause value received by the terminal device is "00011100", it means that a value of the PDU session type transmitted by the terminal device to the network device is not suitable, and the terminal device will no longer use the value of the PDU session type to establish a PDU session, and reselects a suitable value of the PDU session type. Therefore, the terminal device shall not consider any RSD only including the rejected combination of the value of the NS SAI and the value of the DNN, or avoid using the rejected combination of the value of the S-NSSAI and the value of the DNN in the RSD.

If the cause value received by the terminal device is "01000100", it means that the value of the SSC mode transmitted by the terminal device to the network device is not suitable, and the terminal device will not use any RSD including the value of the SSC mode rejected, or eliminate the value of the SSC mode rejected from an RSD in which the SSC mode has multiple values.

If the cause value received by the terminal device is "01000101", it means that the value of the S-NSSAI transmitted by the terminal device to the network device is not suitable, and the terminal device will not use an RSD that only includes the value of the S-NSSAI rejected, or not use the value of the S-NSSAI rejected in an RSD in which the S-NSSAI has multiple values.

In response to reception of the rejection message, the terminal device can determine the RSD satisfying the cause-parameter condition and having a corresponding established PDU session in the precedence order of the RSDs and/or the precedence order of the URSP rules. The terminal device can use the fourth parameter or the value combination of the fourth parameter in the determined RSD to perform data binding or session establishment.

For example, if the value of the SSC mode in the RSD-1 includes the SSC mode-1 and the SSC mode-2, the terminal device can determine a combination of the SSC mode-2 and a value of another parameter in the RSD-1 as the value combination of the fourth parameter.

For another example, suppose that the URSP rule includes the RSD-1, the RSD-2, and the RSD-3, and the precedence order of the RSDs is that the precedence of the RSD-1 is higher than that of the RSD-2 and the precedence of the RSD-2 is higher than that of the RSD-3 (i.e., RSD-1>RSD-2>RSD-3). If the value of the SSC mode in the RSD-1 is only the SSC mode-1, the terminal device can determine whether the RSD-2 with the secondary precedence in the URSP rule satisfies the cause-parameter condition. If the RSD-2 does not have a corresponding established PDU session and the value of the SSC mode in the RSD-2 is only the SSC mode-1, the terminal device shall skip the RSD-2 and determines whether the RSD-3 with the next precedence satisfies the rejection cause. If the RSD-3 does not have a corresponding established PDU session, and the value of the SSC mode in the RSD-3 includes the SSC mode-1 and the SSC mode-2, the terminal device determines a combination of the SSC mode 2 and a value of another parameter in the RSD-3 as the value combination of the fourth parameter. If the RSD-3 does not have a corresponding established PDU session and does not include the SSC mode, it means that for the RSD-3 the SSC mode is not limited, and the terminal device can determine the value of the other parameter in the RSD-3 as the value of the fourth parameter, that is, the fourth parameter does not include the SSC mode, and the network device configures the SSC mode for the terminal device.

For another example, the terminal device receives the cause parameter transmitted by the network device. If the cause parameter indicates the value of the second parameter not supported by the network device, the terminal device may not transmit the second parameter next time the terminal device transmits the session parameter. In other words, the second parameter may not be included in the fourth parameter. Still taking the second parameter as the SSC mode as an example, assuming that the cause parameter indicates that "SSC mode-1 is not supported", the fourth parameter may not include the SSC mode. If the value of the SSC mode in the RSD-1 is only the SSC mode-1, the terminal device can still use a parameter in the RSD-1 to transmit a request message to the network device, and the terminal device takes another parameter in the RSD-1 other than the SSC mode as the fourth parameter. That is, the value of the fourth parameter is still a value of a parameter in the RSD-1, but the fourth parameter does not include the SSC mode. In this case, the network device may configure the SSC mode for the terminal device according to a situation of the network device.

The cause parameter also indicates the value of the third parameter allowed by the network device, and a manner in which the terminal device determines the RSD that satisfies the cause-parameter condition and the value of the fourth parameter is similar to the above manner. Assuming that the cause parameter indicates that the value of the SSC mode allowed by the network device is the SSC mode-2, the terminal device searches for an RSD that includes the SSC mode-2, an RSD that does not include the SSC mode, and an RSD that has a corresponding established PDU session. If the RSD-2 with the secondary precedence does not have a corresponding established PDU session, and the value of the SSC mode in the RSD-2 has only one value which is not the SSC mode-2, the terminal device shall skip the RSD-2. If the RSD-3 does not have a corresponding established PDU session, but the value of the SSC mode in the RSD-3 is the SSC mode-2, then it is determined that the RSD-3 satisfies the cause-parameter condition, and the terminal device can use a parameter in the RSD-3 to conduct PDU session establishment.

After the terminal device traverses all the RSDs in the URSP rule-1, if a PDU session still cannot be successfully established, and/or values of parameters in all the RSDs in the URSP rule-1 do not satisfy the cause-parameter condition, and/or all the RSDs in the URSP rule-1 do not have a corresponding established PDU session, the terminal device can use the URSP rule-2 with the secondary precedence to conduct PDU session establishment. The cause parameter received by the terminal device during the PDU session establishment conducted by using the URSP rule-1 may be applicable to the URSP rule-2 or not applicable to the URSP rule-2.

For example, when the terminal device uses the URSP rule-2 to conduct the PDU session establishment, the terminal device can select the RSD that satisfies the cause-parameter condition according to the previously received cause parameter. The terminal device can then use the RSD satisfying the cause-parameter condition to conduct PDU session establishment.

For another example, when the terminal device uses the URSP rule-2 to conduct PDU session establishment, the terminal device can ignore the previously received cause parameter and directly use a parameter in an RSD with the highest precedence in the URSP rule-2 to conduct PDU session establishment, that is, the terminal device can use a value combination of parameters in the RSD with the highest precedence in the URSP rule-2 to conduct PDU session establishment. That is, even if the value combination of the parameter transmitted by the terminal device includes the value of the parameter not supported by the terminal device, the terminal device can use the value combination of the parameter to conduct PDU session establishment. In this case, the cause parameter received by the terminal device in a URSP rule is only applicable to this URSP rule and not applicable to the URSP rule-2, that is, the cause parameter received by the terminal device in the URSP rule-1 is not applicable to URSP rules other than the URSP rule-1.

Other than the URSP rule-1, the URSP rule-2 is a URSP rule with the highest precedence among URSP rules matching a first application.

In the implementation of the present disclosure, a condition in which the cause parameter becomes valid can be defined. For example, the cause parameter becomes invalid in at least one of the following conditions: a first timer expiring, the terminal device moving out or entering a specific area, the terminal device restarting, and a universal subscriber identity module (USIM) card in the terminal device is removed or replaced, where a time length of the first timer is a time length in which the cause parameter is valid.

In an implementation of the present disclosure, there is no limitation on division of the specific area. For example, the specific area may be divided according to at least one of the following: a cell, a coverage area of a base station, and a tracking area.

The value of the parameter unsupported by the network device and/or the value of the parameter allowed by the network device indicated in the cause parameter may be limited in time length. For example, the cause parameter indicates that the IPv4 is not supported, but after a certain period of time, the IPv4 can become a valid parameter value for the terminal device to conduct PDU session establishment or application-data binding. In response to reception of the cause parameter, the terminal device can start the first timer. Before the first timer expires, the terminal device cannot use the IPv4, but after the first timer expires, the terminal device can use the IPv4.

The first timer may be configured for the terminal device by the network device. For example, the network device may configure the first timer for the terminal device via the first message. Alternatively, the first timer may also be pre-configured in the terminal device.

The value of the parameter unsupported by the network device and/or the value of the parameter allowed by the network device indicated in the cause parameter may be restricted by areas. The cause parameter received by the terminal device is only applicable to a certain area (such as an area that the terminal device is currently in). When the terminal device moves out of this area or enters another area, the previously received cause parameter becomes invalid.

In case that the terminal device restarts or the USIM card is removed from the terminal device, the previously received cause parameter becomes invalid.

After the cause parameter becomes invalid, the terminal device can select, according to the URSP rule matching the first application, a fifth parameter or a value of the fifth parameter to conduct PDU session establishment. For example, the terminal device can use the URSP rule with the highest precedence that matches the first application to conduct PDU session establishment. In other words, after the cause parameter becomes invalid, the terminal device can re-trigger the evaluation process. Assuming that before the cause parameter becomes invalid, the terminal device uses an RSD-4 in the URSP rule-2 (finally used) to conduct PDU session establishment, but after the cause parameter becomes invalid, the terminal device can re-execute the evaluation process and determines that the RSD that does not satisfy the cause-parameter condition previously can satisfy the cause-parameter condition.

The fifth parameter may include at least one of the following parameters: the SSC mode, the S-NSSAI, the DNN, the PDU session type, and the access type.

In an implementation, the terminal device can also set the RSD unsatisfying the cause-parameter condition as an invalid RSD and/or set a parameter combination unsatisfying the cause-parameter condition in an RSD as an invalid RSD parameter combination. In this way, during the evaluation process, the terminal device may not use the invalid RSD or invalid RSD parameter combination to conduct PDU session establishment and/or data-stream binding. Alternatively, the terminal device may set the RSD satisfying the cause-parameter condition as a valid RSD and/or set a parameter combination in the RSD satisfying the cause-parameter condition as a valid RSD parameter combination.

The terminal device can store information of the RSD unsatisfying the cause-parameter condition that is determined according to the cause parameter, for example, the RSD may be stored as the invalid RSD, or the RSD satisfying the cause-parameter condition or an RSD parameter satisfying the cause-parameter condition can be stored as the valid RSD for the next evaluation. For example, after evaluation of a data stream of application 1, in case that it needs to perform evaluation of a data stream of application 2, the terminal device does not use the RSD unsatisfying the cause-parameter condition or an RSD parameter unsatisfying the cause-parameter condition. That is, when determining a value of a session parameter for the second application, the terminal device avoids using the unsupported value of the parameter previously indicated by the network device, or preferentially uses the value of the parameter allowed by the network device.

It is to be noted that the RSD involved in the above evaluation process does not include the non-3GPP offload indication and values of some parameters unsupported by the terminal device (such as the value of the PDU session type).

Figure 7:
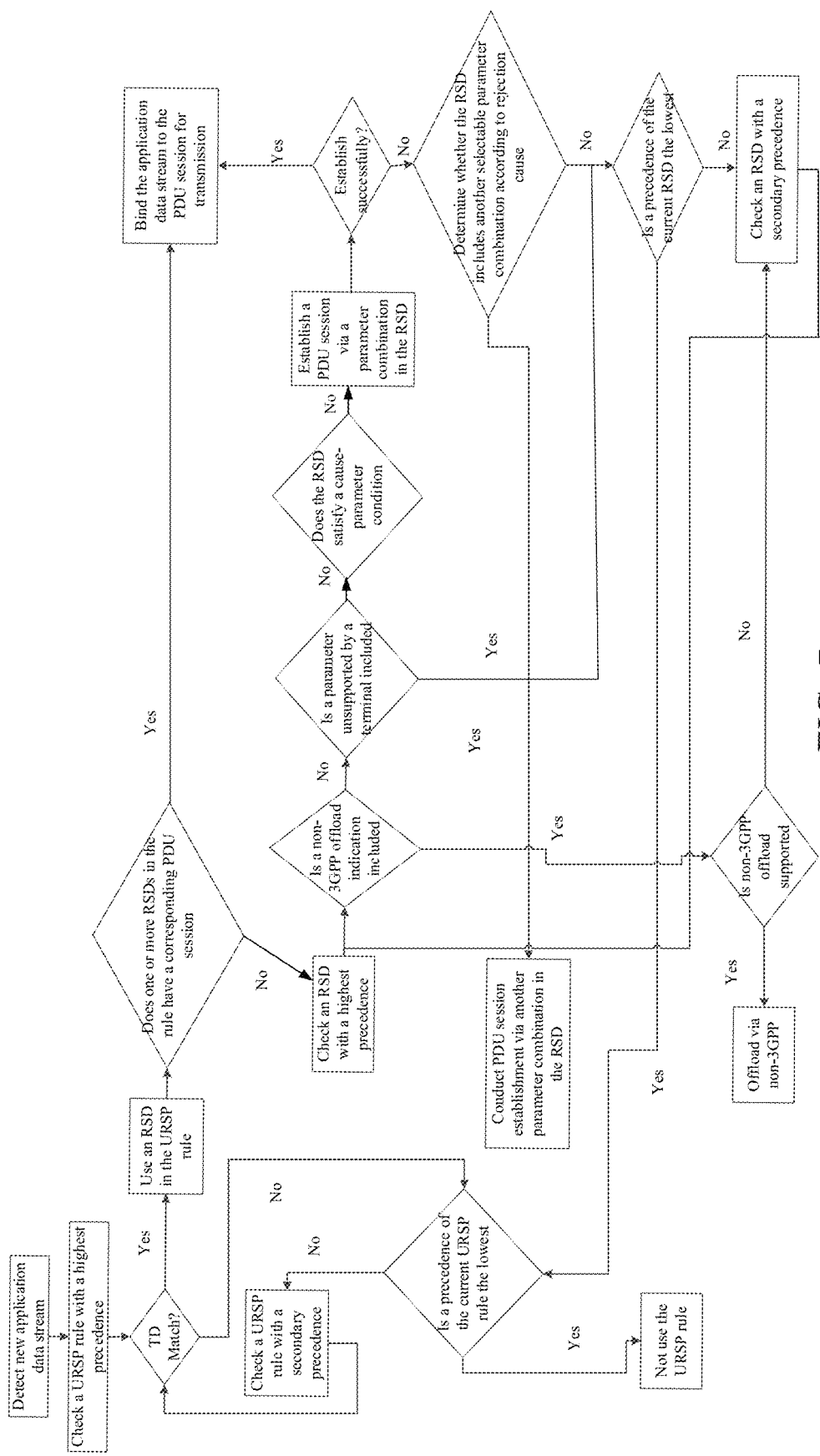
FIG. 7 is a schematic diagram illustrating an evaluation process according to another implementation of the present disclosure.

The method in the implementation of the present disclosure will be described in detail below with reference to FIG. 7.

When the terminal device detects a new application data stream, the terminal device can check the URSP rule with the highest precedence to determine whether the traffic descriptor in the URSP rule with the highest precedence matches the application. If not, the URSP rule with the secondary precedence is checked, and if yes, an RSD in the URSP rule with the highest precedence is used.

The terminal device can determine whether all the RSDs in the URSP rule match existing PDU sessions, respectively. If one RSD in the URSP rule matches an existing PDU session, the terminal device can bind the application data stream to the existing PDU session. If multiple RSDs match multiple existing PDU sessions, respectively, the terminal device can match the application data stream to a PDU session corresponding to an RSD with the highest precedence. If none of all the RSDs in the URSP rule match an existing PDU session, the terminal device can check the RSD with the highest precedence in the URSP rule to determine whether the RSD includes the non-3GPP offload indication.

If the RSD includes the non-3GPP offload indication, the terminal device determines whether the terminal device supports non-3GPP offload. If yes, the terminal device offloads application data stream via non-3GPP, and if not, the terminal device checks the RSD with the secondary precedence. If the RSD does not include the non-3GPP offload indication, the terminal device can further determine whether the RSD includes the parameter unsupported by the terminal device, such as the PDU session type unsupported by the terminal device. If the RSD includes the parameter unsupported by the terminal device, the terminal device can determine whether the RSD is an RSD with the lowest precedence in the current URSP rule. If yes, the terminal device checks the URSP rule with the next precedence, and if not, the terminal device checks the RSD with the next precedence.

If the RSD does not include the parameter unsupported by the terminal device, the terminal device can further determine whether the RSD satisfies the cause-parameter condition. If the terminal device has previously received the cause parameter transmitted by the network device, the terminal device can determine whether the RSD satisfies the cause-parameter condition. If the cause parameter transmitted by the network device has not previously received by the terminal device, the terminal device can directly use a parameter combination in the RSD to transmit the PDU session establishment request message to the network device.

If the RSD satisfies the cause-parameter condition, the terminal device can use the parameter combination in the RSD to conduct PDU session establishment. If a PDU session is successfully established, the network device can bind the application data stream to the PDU session; if no PDU session is successfully established, the network device can determine, according to the cause parameter, whether there is another parameter combination that satisfies the cause-parameter condition in the RSD. If any, the terminal device uses the other parameter combination in the RSD to conduct PDU session establishment, and if not and the RSD is not the RSD with the lowest precedence in the current URSP rule, the terminal device can check the RSD with the next precedence.

The execution process related to the RSD with the next precedence is similar to the foregoing process, which will not be repeated here.

If all the RSDs in the current URSP rule cannot be used to successfully establish a PDU session, the terminal device can check the URSP rule with the next precedence, and then execute the above process. It should be noted that the URSP rule with the next precedence may not be limited to the cause parameter received in the process of checking the URSP rule with a previous precedence, that is to say, the cause parameter received by checking the URSP rule with the previous precedence becomes invalid for a URSP rule with another precedence.

If the terminal device still cannot successfully establish a PDU session after the URSP rule with the lowest precedence is checked, the terminal device does not use the URSP rules to establish a PDU session.

It is to be noted that in the implementation of the present disclosure, there is no limitation on an execution order of determining whether the RSD includes the non-3GPP offload indication, determining whether the RSD includes the parameter unsupported by the terminal device, and determining whether the RSD satisfies the cause-parameter condition. For example, the terminal device may first determine whether the RSD includes the non-3GPP offload indication, and then determine whether the RSD includes the parameter unsupported by the terminal device and whether the RSD satisfies the cause-parameter condition. For another example, the terminal device may first determine whether the RSD includes the parameter unsupported by the terminal device, and then determine whether the RSD includes the non-3GPP offload indication and whether the RSD satisfies the cause-parameter condition. For yet another example, the terminal device may first determine whether the RSD satisfies the cause-parameter condition, and then determine whether the RSD includes the non-3GPP offload indication and the parameter unsupported by the terminal device.

In addition to the PDU session type, the parameter unsupported by the terminal device may also include another parameter, such as the SSC mode, and the SSC mode-3 is unsupported by the terminal device.

The SSC mode-1 means that a user plane function (UPF) or a packet data network (PDN) gateway (GW) for a PDU session is always unchanged. The SSC mode-2 means that in case that the UPF or the PDN GW for the PDU session is changed, original connection is disconnected first, and a connection with a new UPF or PDN GW is established.

The SSC mode-3 shall ensure that in case that the UPF or the PDN GW for the PDU session is changed (or an address of the PDU session/PDN connection is changed), service transmission is not interrupted (for example, an establishment-first disconnection-after manner is adopted, that is, after the application data stream is bound to the new UPF for transmission via a newly allocated address, the connection with the original UPF is then disconnected.)

The above describes in detail the method for session establishment according to the implementation of the present disclosure. The following will describes a device according to an implementation of the present disclosure in combination with FIG. 8 to FIG. 12. The technical features described in the method implementation is applicable to a device implementation described below.

Figure 8:
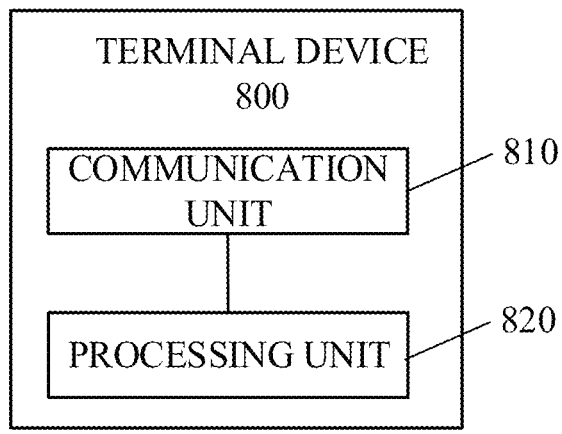
FIG. 8 is a schematic block diagram illustrating a terminal device according to an implementation of the present disclosure.

FIG. 8 is a schematic block diagram illustrating a terminal device 800 according to an implementation of the present disclosure. The terminal device 800 may be any terminal device described above. The terminal device 800 illustrated in FIG. 8 includes a communication unit 810 and a processing unit 820.

The communication unit 810 is configured to receive a first message transmitted by a network device, where the first message includes a cause parameter.

The processing unit 820 is configured to ignore or not use, according to the cause parameter, an RSD unsatisfying a cause-parameter condition and/or a parameter-value combination unsatisfying the cause-parameter condition in an RSD.

In an implementation, the first message is a reply message corresponding to a PDU session establishment or modification request message, where the PDU session establishment or modification request message includes a value of a first parameter, and the value of the first parameter is a value of a parameter in an RSD in a URSP rule matching a first application data stream.

In an implementation, the cause parameter indicates at least one of: a value or a value combination of a second parameter unsupported by the network device, or a value or a value combination of a third parameter allowed by the network device. An RSD satisfying the cause-parameter condition includes at least one of: an RSD in which a value of the second parameter includes another value besides the value unsupported by the network device, an RSD in which the second parameter is not included, an RSD in which a value of the third parameter includes the value allowed by the network device, or an RSD in which the third parameter is not included, where a parameter-value combination in the RSD satisfying the cause-parameter condition refers to a parameter-value combination satisfying the cause-parameter condition in the RSD.

In an implementation, the communication unit 810 is configured to transmit a second message to the network device via a fourth parameter or a value combination of the fourth parameter in the RSD satisfying the cause-parameter condition, where the second message is used for requesting PDU session establishment or modification.

In an implementation, the fourth parameter or the value of the fourth parameter satisfies at least one of: the fourth parameter not including the second parameter, the value of the second parameter in the fourth parameter not including the value unsupported by the network device, the value of the third parameter in the fourth parameter including the value allowed by the network device, or the fourth parameter not including the third parameter.

In an implementation, the processing unit 820 is configured to transmit the second message to the network device via the RSD satisfying the cause-parameter condition, in a precedence order of RSDs and/or a precedence order of URSP rules.

In an implementation, the processing unit 820 is configured to check whether a currently used RSD includes a value combination of the fourth parameter that satisfies the cause-parameter condition and is not used, in the precedence order of the RSDs and/or the precedence order of the URSP rules; initiate PDU session establishment via the value combination of the fourth parameter in response to the currently used RSD including the value combination of the fourth parameter that satisfies the cause-parameter condition and is not used, or check whether an RSD with a secondary precedence satisfies the cause-parameter condition in response to the currently used RSD not including the value combination of the fourth parameter that satisfies the cause-parameter condition and is not used; and transmit the second message to the network device via a value combination of the fourth parameter satisfying the cause-parameter condition in the RSD with the secondary precedence, in response to the RSD with the secondary precedence satisfying the cause-parameter condition, or check an RSD with a next precedence in response to the RSD with the secondary precedence unsatisfying the cause-parameter condition.

In an implementation, the currently used RSD and the RSD with the secondary precedence include no non-3GPP offload indication and/or no parameter value unsupported by the terminal device.

In an implementation, the RSD including the value combination of the fourth parameter is an RSD with a highest precedence among RSDs satisfying the cause-parameter condition.

In an implementation, the RSD with the highest precedence is an RSD with a highest precedence in a URSP rule or different URSP rules.

In an implementation, the processing unit 820 is configured to ignore or not use the RSD including a non-3GPP offload indication and a parameter unsupported by the terminal device.

In an implementation, the value of the first parameter is a value of a parameter in a first RSD, where the first RSD is in a first URSP rule. The processing unit 820 is configured to conduct, in response to values of parameters in all RSDs in the first URSP rule unsatisfying the cause-parameter condition or in response to failure of PDU session establishment conducted by the terminal device via the values of the parameters in all the RSDs in the first URSP rule, PDU session establishment via an RSD having a corresponding PDU session or an RSD satisfying the cause-parameter condition in a second URSP rule.

In an implementation, other than the first URSP rule, the second URSP rule is a URSP rule with a highest precedence among URSP rules matching the first application data stream.

In an implementation, the value of the first parameter is a value of a parameter in a first RSD, wherein the first RSD is in a first URSP rule, and the cause parameter is unsuitable for other URSP rules other than the first URSP rule.

In an implementation, the cause-parameter condition is suitable for evaluation processes of other application data streams besides an evaluation process of the first application data stream.

In an implementation, the processing unit 820 is configured to store the RSD satisfying the cause-parameter condition as a valid RSD for the evaluation processes of the other application data streams.

In an implementation, the cause-parameter condition becomes invalid in at least one of: a first timer expiring, the terminal device moving out or into a specified area, the terminal device restarting, a USIM card in the terminal device being replaced or removed, where a time length of the first timer is a time length in which the cause parameter is valid.

In an implementation, the processing unit 820 is configured to determine, according to the URSP rules matching the first application data stream, a value combination of a fifth parameter to conduct PDU session establishment, in response to the cause-parameter condition becoming invalid.

In an implementation, the value combination of the fifth parameter is a value combination of a parameter in an RSD with a highest precedence in a URSP rule with a highest precedence among the URSP rules matching the first application data stream.

In an implementation, the specified area where the terminal device is in is divided according to at least one of: a cell, a coverage area of a base station, or a tracking area.

In an implementation, the first timer is carried in the cause parameter or preconfigured in the terminal device.

In an implementation, the first parameter, the second parameter, the third parameter, the fourth parameter, and/or the fifth parameter include at least one of: an SSC mode, S-NSSAI, a DNN, a PDU session type, or an access type.

In an implementation, the cause parameter includes a rejection cause, and a value of the first parameter unsupported by the network device is carried in the rejection cause.

In an implementation, the processing unit 820 is configured to store the RSD satisfying the cause-parameter condition as a valid RSD, store a parameter combination in the RSD satisfying the cause-parameter condition as a valid RSD parameter combination, store the RSD unsatisfying the cause-parameter condition as an invalid RSD, and/or store an RSD parameter combination unsatisfying the cause-parameter as an invalid RSD parameter combination.

Figure 9:
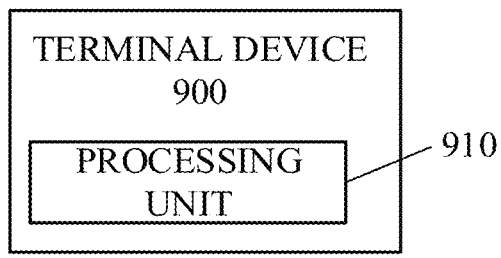
FIG. 9 is a schematic block diagram illustrating a terminal device according to another implementation of the present disclosure.

FIG. 9 is a schematic block diagram illustrating a terminal device 900 according to an implementation of the present disclosure. The terminal device 900 may be any terminal device described above. The terminal device 900 illustrated in FIG. 9 includes a processing unit 910.

The processing unit 910 is configured to ignore or not use, according to support of a terminal capability, an RSD unsatisfying a terminal-capability condition and/or a parameter-value combination unsatisfying the terminal-capability condition in an RSD, where the terminal capability includes a value of an SSC mode supported by the terminal device, and a value of the SSC mode in an RSD satisfying the terminal-capability condition is the value of the SSC mode supported by the terminal device.

In an implementation, the processing unit 910 is configured to check RSDs in a precedence order of the RSDs and/or a precedence order of URSP rules.

In an implementation, the processing unit 910 is configured to not use a first RSD and check another RSD in response to a value of the SSC mode in the first RSD being an SSC mode-3 and the SSC mode-3 being unsupported by the terminal device.

In some implementations, the communication unit may be a communication interface or a transceiver, or an input-output interface on a communication chip or a system on a chip (SoC). The processing unit may be one or more processors.

Figure 10:
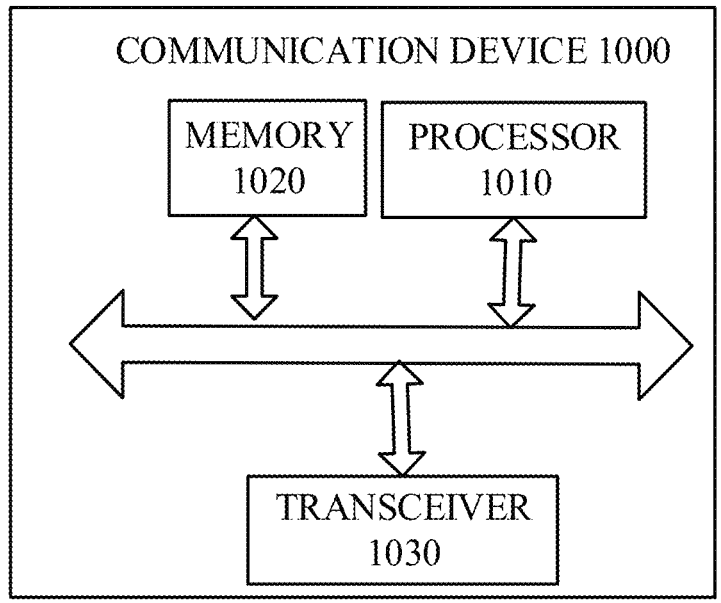
FIG. 10 is a schematic block diagram illustrating a communication device according to an implementation of the present disclosure.

FIG. 10 is a schematic structural diagram illustrating a communication device 1000 according to an implementation of the present disclosure. The communication device 1000 illustrated in FIG. 10 includes a processor 1010. The processor 1010 can invoke and run computer programs in a memory to implement the method in the implementation of the present disclosure.

In an implementation, as illustrated in FIG. 10, the communication device 1000 further includes a memory 1020. The processor 1010 can invoke and run the computer programs in the memory 1020 to implement the method in the implementation of the present disclosure.

The memory 1020 may be a single device independent of the processor 1010, and may also be integrated in the processor 1010.

In an implementation, as illustrated in FIG. 10, the communication device 1000 may further include a transceiver 1030. The processor 1010 can control the transceiver 1030 to communicate with other devices, for example, to transmit information or data to the other devices or receive information or data from the other devices.

In an implementation, the transceiver 1030 may include a transmitter and a receiver. The transceiver 1030 may further include one or more antennas.

The communication device 1000 may be the network device in the implementations of the present disclosure, and the communication device 1000 can implement corresponding procedures realized by the network device in the methods in the implementations of the present disclosure, which will not be repeated herein for simplicity.

The communication device 1000 may be the mobile terminal/terminal device in the implementations of the present disclosure, and the communication device 1000 can implement corresponding procedures realized by the mobile terminal/terminal device in the implementations of the present disclosure, which will not be repeated herein for simplicity.

Figure 11:
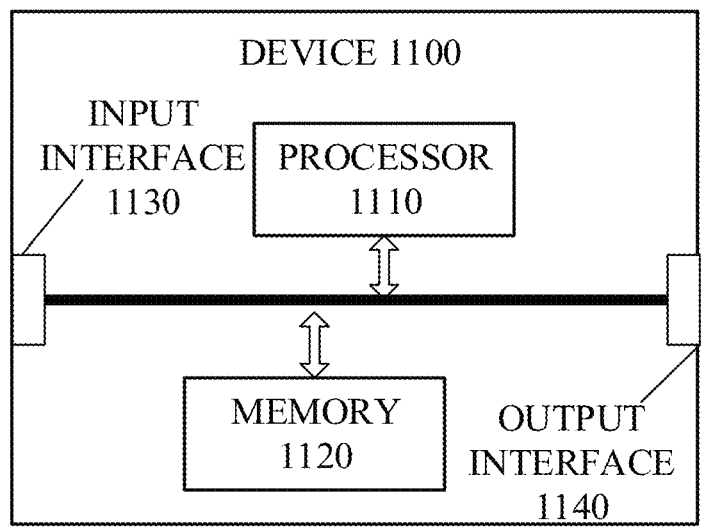
FIG. 11 is a schematic block diagram illustrating a device according to an implementation of the present disclosure.

FIG. 11 is a schematic structural diagram illustrating a device 1100 according to an implementation of the present disclosure. The device 1100 illustrated in FIG. 11 includes a processor 1110. The processor 1110 can invoke and run at least one computer program stored in a memory to implement the methods in the implementation of the present disclosure.

In an implementation, as illustrated in FIG. 11, the device 1100 further includes a memory 1120. The processor 1110 can invoke and run at least one computer program stored in the memory 1120 to implement the methods in the implementations of the present disclosure.

The memory 1120 may be a single device independent of the processor 1110, and may also be integrated in the processor 1110.

In an implementation, the device 1100 may further include an input interface 1130. The processor 1110 can control the input interface 1130 to communicate with other devices or chips, for example, to receive information or data from the other devices or chips.

In an implementation, the device 1100 may further include an output interface 1140. The processor 1110 can control the output interface 1140 to communicate with other devices or chips, for example, to output information or data to the other devices or chips.

The device can be applied to the network device in the implementations of the present disclosure, and the chip can implement corresponding procedures realized by the network device in the methods in the implementations of the present disclosure, which will not be repeated herein for simplicity.

The device can be applied to the mobile terminal/terminal device in the implementations of the present disclosure, and the device can implement corresponding procedures realized by the mobile terminal/terminal device in the methods in the implementations of the present disclosure, which will not be repeated herein for simplicity.

It is to be understood that the device referred in the implementation of the present disclosure may also be referred to as a system-level chip, a system chip, a chip system, an SoC, or the like.

Figure 12:
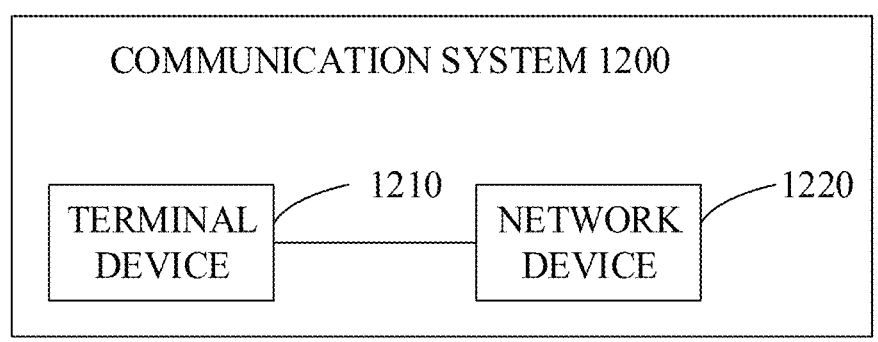
FIG. 12 is a schematic diagram illustrating a communication system according to an implementation of the present disclosure.

FIG. 12 is a schematic block diagram illustrating a communication system 1200 according to an implementation of the present disclosure. As illustrated in FIG. 12, the communication system 1200 includes a terminal device 1210 and a network device 1220.

The terminal device 1210 can implement corresponding functions realized by the terminal device in the above method, and the network device 1220 can implement corresponding functions realized by the network device in the above method, which will not be repeated herein for simplicity.

It is to be understood that the processor in the implementation of the present disclosure may be an integrated circuit chip with signal processing capability. In the implementation process, the steps of the foregoing method implementations can be completed by hardware integrated logic circuits in the processor or instructions in the form of software. The above-mentioned processor may be a general-purpose processor, a digital signal processor (DSP), an application specific integrated circuit (ASIC), a field programmable gate array (FPGA) or other programming logic devices, discrete gates or transistor logic devices, or discrete hardware components. The methods, steps, and logical block diagrams disclosed in the implementations of the present disclosure can be implemented or executed. The general-purpose processor may be a microprocessor or the processor may also be any conventional processor or the like. The steps of the methods disclosed in the implementations of the present disclosure can be directly executed and completed by a hardware decoding processor, or executed and completed by a combination of hardware and software modules in the decoding processor. The software modules can be located in a mature storage medium in the field such as a random access memory (ROA), a flash memory, a read-only memory (ROM), a programmable read-only memory (PROM), an electrically erasable programmable memory, or a register. The storage medium is located in the memory, and the processor reads information in the memory and completes the steps of the above methods in combination with its hardware.

It can be understood that the memory may be a volatile memory or a non-volatile memory, and may also include both the volatile memory and non-volatile memory. The non-volatile memory may be a ROM, a PROM, an erasable programmable read-only memory (EPROM), an electrically erasable programmable read-only memory (EEPROM), or a flash memory. The volatile memory may be a RAM and used for external high-speed cache. By way of examples rather than limitation, various random access memories can be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synclink dynamic random access memory (SLDRAM), and a direct rambus random access memory (DR RAM). It is to be noted that the memory described in this specification is intended to include but is not limited to these and any other suitable types of memories.

It is to be noted that the above memories are exemplary but not used for limitation. For example, the memory in the implementation of the present disclosure may also be an SRAM, a DRAM, an SDRAM, a DDR SDRAM, an ESDRAM, an SLDRAM, and a DR RAM. That is, the memory described in the implementation of the present disclosure is intended to include but is not limited to these and any other suitable types of memories.

Implementations of the present disclosure further provide a computer-readable storage medium configured to store at least one computer program.

In an implementation, the computer-readable storage medium can be applied to the network device in the implementations of the present disclosure, and the computer program enables a computer to execute corresponding procedures realized by the network device in the above methods in the implementations of the present disclosure, which will not be repeated herein for simplicity.

In an implementation, the computer-readable storage medium can be applied to the mobile terminal/terminal device in the implementations of the present disclosure, and the computer program enables the computer to execute corresponding procedures realized by the mobile terminal/terminal device in the above methods in the implementations of the present disclosure, which will not be repeated herein for simplicity.

Implementations of the present disclosure further provide a computer program product which includes at least one computer program instruction.

In an implementation, the computer program product can be applied to the network device in the implementations of the present disclosure, and the computer program instruction enables the computer to execute corresponding procedures realized by the network device in the above methods in the implementations of the present disclosure, which will not be repeated herein for simplicity.

In an implementation, the computer program product can be applied to the mobile terminal/terminal device in the implementations of the present disclosure, and the computer program instruction enables the computer to execute corresponding procedures realized by the mobile terminal/terminal device in the above methods in the implementations of the present disclosure, which will not be repeated herein for simplicity.

Implementations of the present disclosure further provide a computer program.

In an implementation, the computer program can be applied to the network device in the implementations of the present disclosure, and the computer program, when run in the computer, enables the computer to execute corresponding procedures realized by the network device in the above methods in the implementations of the present disclosure, which will not be repeated herein for simplicity.

In an implementation, the computer program can be applied to the mobile terminal/terminal device in the implementations of the present disclosure, and the computer program, when run in the computer, enables the computer to execute corresponding procedures realized by the mobile terminal/terminal device in the above methods in the implementations of the present disclosure, which will not be repeated herein for simplicity.

Those of ordinary skill in the art will appreciate that units and algorithmic operations of various examples described in connection with the implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, devices, and units, reference can be made to the corresponding processes of the above method implementations, which will not be repeated herein.

According to the several implementations provided in the present disclosure, it will be appreciated that the systems, devices, and methods disclosed in implementations herein may also be implemented in various other manners. For example, the above device implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, devices or units, and may be electrical coupling, mechanical coupling, or the like.

Separated units as illustrated may or may not be physically separated. Components or parts displayed as units may or may not be physical units, and may reside at one location or may be distributed to multiple networked units. Some of or all the units may be selectively adopted according to practical needs to achieve objectives of the solutions of the present disclosure.

In addition, the functional units in the various implementations of the present disclosure may be integrated into one processing unit, or each unit may exist alone physically, or two or more units may be integrated into one unit.

If the integrated units are implemented as software functional units and sold or used as standalone products, they may be stored in a computer readable storage medium. Based on such an understanding, the essential technical solution, or the portion that contributes to the relate art, or part of the technical solution of the present disclosure may be embodied as software products. The computer software products can be stored in a storage medium and may include multiple instructions that, when executed, can cause a computing device, e.g., a personal computer, a server, a network device, etc., to execute some of or all operations of the methods described in various implementations of the present disclosure. The above storage medium may include various kinds of medium that can store program codes, such as a universal serial bus (USB) flash disk, a mobile hard drive, a ROM, a RAM, a magnetic disk, or an optical disk.

The above are only specific implementations of the present disclosure, and the protection scope of the present disclosure is not limited to this. Any person skilled in the art can easily think of changes or substitutions within the technical scope disclosed in the present disclosure, and these changes or substitutions shall fall within the protection scope of the present disclosure. Therefore, the protection scope of the present disclosure shall be subject to the protection scope of the claims.

What is claimed is:

1. A method for wireless communication, comprising:
receiving, by a terminal device, a first message transmitted by a network device, the first message comprising a cause parameter; and
ignoring or skipping using, by the terminal device, a route selection descriptor (RSD) unsatisfying a cause-parameter condition according to the cause parameter, the cause-parameter condition comprising at least one of:
whether a rejection cause in the cause parameter indicates that a service and session continuity (SSC) mode is not supported;
an allowed SSC mode in the cause parameter; or
whether a combination of a data network name (DNN) and single-network slice selection assistant information (S-NSSAI) in a current RSD differs from a combination of a DNN and S-NSSAI used for initiation of a previous protocol data unit (PDU) session;
wherein the method further comprises:
transmitting, by the terminal device, a second message to the network device via a fourth parameter or a value combination of the fourth parameter in an RSD satisfying the cause-parameter condition, wherein the second message is used for requesting PDU session establishment or modification;
wherein transmitting, by the terminal device, the second message to the network device via the fourth parameter or the value combination of the fourth parameter in the RSD satisfying the cause-parameter condition, comprises:
transmitting, by the terminal device, the second message to the network device via the RSD satisfying the cause-parameter condition, in a precedence order of RSDs.

2. The method of claim 1, wherein the first message is a reply message corresponding to a PDU session establishment or modification request message, wherein the PDU session establishment or modification request message comprises a value of a first parameter, wherein the value of the first parameter is a value of a parameter in an RSD in a user equipment (UE) route selection policy (URSP) rule matching a first application data stream.

3. The method of claim 2, wherein:
the cause parameter is indicative of at least one of: a value or a value combination of a second parameter unsupported by the network device, or a value or a value combination of a third parameter allowed by the network device;
the RSD satisfying the cause-parameter condition comprises at least one of: an RSD in which a value of the second parameter comprises another value besides the value unsupported by the network device, an RSD in which the second parameter is not comprised, an RSD in which a value of the third parameter comprises the value allowed by the network device, or an RSD in which the third parameter is not comprised.

4. The method of claim 3, wherein the first parameter, the second parameter, the third parameter, and the fourth parameter are an SSC mode.

5. A method for wireless communication, comprising:
transmitting, by a network device, a first message to a terminal device, the first message comprising a cause parameter, and the cause parameter being used by the terminal device to determine to ignore or skip using a route selection descriptor (RSD) unsatisfying a cause-parameter condition, the cause-parameter condition comprising at least one of:
whether a rejection cause in the cause parameter indicates that a service and session continuity (SSC) mode is not supported;
an allowed SSC mode in the cause parameter; or
whether a combination of a data network name (DNN) and single-network slice selection assistant information (S-NSSAI) in a current RSD differs from a combination of a DNN and S-NSSAI used for initiation of a previous protocol data unit (PDU) session;
wherein the method further comprises:
receiving, by the network device, a second message transmitted by the terminal device via a fourth parameter or a value combination of the fourth parameter in an RSD satisfying the cause-parameter condition, wherein the second message is used for requesting PDU session establishment or modification;
wherein receiving, by the network device, the second message transmitted by the terminal device via the fourth parameter or the value combination of the fourth parameter in the RSD satisfying the cause-parameter condition, comprises:
receiving, by the network device, the second message transmitted by the terminal device via the RSD satisfying the cause-parameter condition in a precedence order of RSDs.

6. The method of claim 5, wherein the first message is a reply message corresponding to a PDU session establishment or modification request message, wherein the PDU session establishment or modification request message comprises a value of a first parameter, wherein the value of the first parameter is a value of a parameter in an RSD in a user equipment (UE) route selection policy (URSP) rule matching a first application data stream.

7. The method of claim 6, wherein:
the cause parameter is indicative of at least one of: a value or a value combination of a second parameter unsupported by the network device, or a value or a value combination of a third parameter allowed by the network device;
the RSD satisfying the cause-parameter condition comprises at least one of: an RSD in which a value of the second parameter comprises another value besides the value unsupported by the network device, an RSD in which the second parameter is not comprised, an RSD in which a value of the third parameter comprises the value allowed by the network device, or an RSD in which the third parameter is not comprised.

8. The method of claim 7, wherein the first parameter, the second parameter, the third parameter, and the fourth parameter are an SSC mode.

9. A terminal device, comprising:
a transceiver;
a processor; and
a memory storing a computer program which, when executed by the processor, causes the transceiver to:
receive a first message transmitted by a network device, the first message comprising a cause parameter;
wherein the computer program which, when executed by the processor, further causes the processor to:
ignore or skip using a route selection descriptor (RSD) unsatisfying a cause-parameter condition according to the cause parameter, the cause-parameter condition comprising at least one of:
whether a rejection cause in the cause parameter indicates that a service and session continuity (SSC) mode is not supported;
an allowed SSC mode in the cause parameter; or
whether a combination of a data network name (DNN) and single-network slice selection assistant information (S-NSSAI) in a current RSD differs from a combination of a DNN and S-NSSAI used for initiation of a previous protocol data unit (PDU) session;
wherein the computer program which, when executed by the processor, further causes the transceiver to:
transmit a second message to the network device via a fourth parameter or a value combination of the fourth parameter in an RSD satisfying the cause-parameter condition, wherein the second message is used for requesting PDU session establishment or modification;
wherein the computer program which, when executed by the processor, causes the transceiver to transmit the second message to the network device via the fourth parameter or the value combination of the fourth parameter in the RSD satisfying the cause-parameter condition causes the transceiver to:
transmit the second message to the network device via the RSD satisfying the cause-parameter condition, in a precedence order of RSDs.

10. The terminal device of claim 9, wherein the first message is a reply message corresponding to a PDU session establishment or modification request message, wherein the PDU session establishment or modification request message comprises a value of a first parameter, wherein the value of the first parameter is a value of a parameter in an RSD in a user equipment (UE) route selection policy (URSP) rule matching a first application data stream.

11. The terminal device of claim 10, wherein
the cause parameter is indicative of at least one of: a value or a value combination of a second parameter unsupported by the network device, or a value or a value combination of a third parameter allowed by the network device;
the RSD satisfying the cause-parameter condition comprises at least one of: an RSD in which a value of the second parameter comprises another value besides the value unsupported by the network device, an RSD in which the second parameter is not comprised, an RSD in which a value of the third parameter comprises the value allowed by the network device, or an RSD in which the third parameter is not comprised.

12. The terminal device of claim 11, wherein the first parameter, the second parameter, the third parameter, and the fourth parameter are an SSC mode.

13. A network device, comprising:
a transceiver;
a processor; and
a memory storing a computer program which, when executed by the processor, causes the transceiver to:
transmit a first message to a terminal device, the first message comprising a cause parameter, and the cause parameter being used by the terminal device to determine to ignore or skip using a route selection descriptor (RSD) unsatisfying a cause-parameter condition, the cause-parameter condition comprising at least one of:
whether a rejection cause in the cause parameter indicates that a service and session continuity (SSC) mode is not supported;
an allowed SSC mode in the cause parameter; or
whether a combination of a data network name (DNN) and single-network slice selection assistant information (S-NSSAI) in a current RSD differs from a combination of a DNN and S-NSSAI used for initiation of a previous protocol data unit (PDU) session;
wherein the computer program which, when executed by the processor, further causes the transceiver to:
receive a second message transmitted by the terminal device via a fourth parameter or a value combination of the fourth parameter in an RSD satisfying the cause-parameter condition, wherein the second message is used for requesting PDU session establishment or modification;
wherein the computer program which, when executed by the processor, causes the transceiver to receive the second message transmitted by the terminal device via the fourth parameter or the value combination of the fourth parameter in the RSD satisfying the cause-parameter condition causes the transceiver to:
receive the second message transmitted by the terminal device via the RSD satisfying the cause-parameter condition in a precedence order of RSDs.

14. The network device of claim 13, wherein the first message is a reply message corresponding to a PDU session establishment or modification request message, wherein the PDU session establishment or modification request message comprises a value of a first parameter, wherein the value of the first parameter is a value of a parameter in an RSD in a user equipment (UE) route selection policy (URSP) rule matching a first application data stream.

15. The network device of claim 14, wherein
the cause parameter is indicative of at least one of: a value or a value combination of a second parameter unsupported by the network device, or a value or a value combination of a third parameter allowed by the network device;
the RSD satisfying the cause-parameter condition comprises at least one of: an RSD in which a value of the second parameter comprises another value besides the value unsupported by the network device, an RSD in which the second parameter is not comprised, an RSD in which a value of the third parameter comprises the value allowed by the network device, or an RSD in which the third parameter is not comprised.

16. The network device of claim 15, wherein the first parameter, the second parameter, the third parameter, and the fourth parameter are an SSC mode.

17. The method of claim 1, further comprising:
ignoring or skipping using, by the terminal device, an RSD comprising a non-3rd generation partnership project (non-3GPP) offload indication and a parameter unsupported by the terminal device.

18. The method of claim 1, further comprising:
storing, by the terminal device, the RSD satisfying the cause-parameter condition as a valid RSD; or
storing, by the terminal device, a parameter combination in the RSD satisfying the cause-parameter condition as a valid RSD parameter combination.

19. The terminal device of claim 9, wherein the computer program which, when executed by the processor, further causes the processor to:

ignore or skip using an RSD comprising a non-3GPP offload indication and a parameter unsupported by the terminal device.

20. The terminal device of claim 9, wherein the computer program which, when executed by the processor, further causes the processor to:
  store the RSD satisfying the cause-parameter condition as a valid RSD; or
  store a parameter combination in the RSD satisfying the cause-parameter condition as a valid RSD parameter combination.

* * * * *